Dec. 15, 1953 J. Y. HOWARD 2,662,971

CODED TRACK CIRCUIT SIGNALING SYSTEM

Filed July 15, 1949 10 Sheets-Sheet 1

INVENTOR.
J. Y. Howard,
BY Neil W. Preston,
HIS ATTORNEY.

Dec. 15, 1953 J. Y. HOWARD 2,662,971

CODED TRACK CIRCUIT SIGNALING SYSTEM

Filed July 15, 1949 10 Sheets-Sheet 2

INVENTOR.
J. Y. Howard,
BY Neil D. Preston,
HIS ATTORNEY.

CODED TRACK CIRCUIT SIGNALING SYSTEM

Filed July 15, 1949 10 Sheets-Sheet 3

INVENTOR.
J. Y. Howard,
BY
Neil D. Preston,
HIS ATTORNEY.

INVENTOR.
J. Y. Howard,
BY Neil H. Preston,
HIS ATTORNEY.

Dec. 15, 1953 J. Y. HOWARD 2,662,971

CODED TRACK CIRCUIT SIGNALING SYSTEM

Filed July 15, 1949 10 Sheets-Sheet 5

INVENTOR.
J. Y. Howard,
BY Neil W. Preston
HIS ATTORNEY.

INVENTOR.
J. Y. Howard,
BY Neil W. Preston,
HIS ATTORNEY.

Dec. 15, 1953 J. Y. HOWARD 2,662,971

CODED TRACK CIRCUIT SIGNALING SYSTEM

Filed July 15, 1949 10 Sheets-Sheet 7

INVENTOR.
J. Y. Howard,
BY Neil W. Preston,
HIS ATTORNEY.

CODED TRACK CIRCUIT SIGNALING SYSTEM

Filed July 15, 1949 10 Sheets-Sheet 8

INVENTOR.
J. Y. Howard.
BY Neil W. Preston.
HIS ATTORNEY.

Dec. 15, 1953 J. Y. HOWARD 2,662,971

CODED TRACK CIRCUIT SIGNALING SYSTEM

Filed July 15, 1949 10 Sheets-Sheet 9

INVENTOR.
J. Y. Howard.
BY Neil W. Preston
HIS ATTORNEY.

Dec. 15, 1953 J. Y. HOWARD 2,662,971

CODED TRACK CIRCUIT SIGNALING SYSTEM

Filed July 15, 1949 10 Sheets-Sheet 10

INVENTOR.
J. Y. Howard
BY Neil W. Preston
HIS ATTORNEY.

Patented Dec. 15, 1953

2,662,971

UNITED STATES PATENT OFFICE 2,662,971

CODED TRACK CIRCUIT SIGNALING SYSTEM

James Y. Howard, Greece, N. Y., assignor to General Railway Signal Company, Rochester, N. Y.

Application July 15, 1949, Serial No. 104,901

15 Claims. (Cl. 246—33)

Figure 1A:
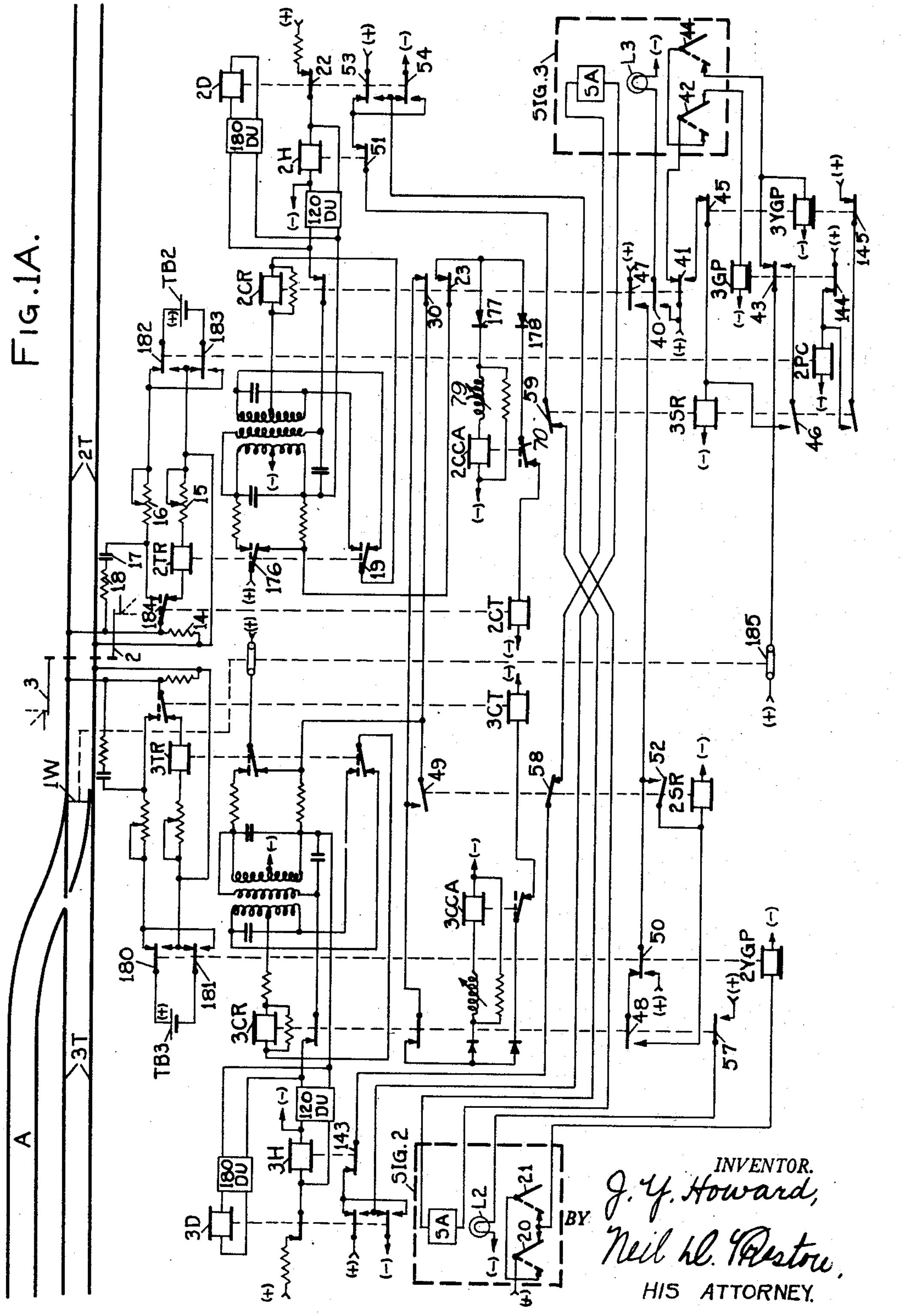

The present invention relates to automatic signalling systems for railroads, and more particularly pertains to the application of coded track circuits to the controlling of wayside signals of a single track railroad. The signalling system described herein is of the type commonly known as an absolute-permissive-block signalling system and, as such, provides protection against opposing train movements between head-block signals and also permits following train moves with the customary block spacing protection.

The conventional coded track circuit provides for the transmission over the track rails of pulses of current which are intermittently applied to one end of a track section with the spaced intervals between the pulses known as "off" periods. Such a code is commonly termed a "driven" code, the rate at which the pulses are applied to the track circuit being in accordance with the current traffic conditions. At the other end of each track section there is, in addition to the code responsive means which receives the driven code pulses, an inverse code transmitter which transmits code pulses upon the track circuit during the "off" periods of the driven code. This latter code is known as an "inverse" code. At the end of the track section sending the driven code, suitable means are employed to receive the inverse code pulses.

Generally speaking and without attempting to define the invention in exact detail, the various controls for the signals of the system described herein are transmitted both by driven and inverse codes with the driven codes being of distinctive rates and the inverse codes of distinctive polarities. Thus, each block comprising a portion of track between consecutive signals is to be divided by insulating joints at its midportion into two separate track sections and, by means of the circuit organization provided, both driven and inverse codes are to be alternately applied to each of these track sections. In this manner, the required number of signal controls may be transmitted in a symmetrical system employing a minimum of equipment while still providing for approach lighting of all the wayside signals.

With the trackway unoccupied, the signals have their mechanisms all operated to clear positions, but the signal indications are not displayed if approach lighting is employed. The driven codes transmitted in the track circuits at this time are at a 180 rate, and the inverse codes are of a positive polarity.

Driven codes are always transmitted from each cut-section in both directions at code rates selected in accordance with traffic conditions; but rather than prevent transmission of a driven code when a signal is desired to be put to stop, a 75 rate code is transmitted as a carrier for the inverse code that is transmitted in the opposite direction, the caution control of a signal being only in response to a 120 code rate. Thus the control of the code rate to be transmitted to a signal from a cut section is selected in accordance with the polarity of the inverse code received at the cut section as transmitted from the next signal in the rear for each direction of traffic. In this manner, any one of three code rates can be selected from driven transmission in accordance with the polarity or absence of inverse code transmitted from the next signal in the rear.

An object of the present invention is therefore to continuously transmit driven codes at selected code rates in both directions from the respective cut sections between signal locations for a stretch of single track, irrespective of the direction of train movements, the code rates being determined by the character or absence of inverse code transmitted to the cut-section from the next signal in the rear for either direction of traffic.

Another object of the present invention is to communicate driven codes from the cut-section at distinctive rates for governing respectively the clear and caution control of the respective signals, and at a third distinctive rate as a carrier for inverse code transmission in the opposite direction when the signal subject to driven code control for the associated track section is at stop.

It is proposed that upon the entrance of a train into the stretch of single track between head-block locations a tumble-down will occur so as to place all opposing signals in that stretch of track at stop. A further object, therefore, is to provide in the case of a tumble-down for the transmission, in the direction of movement of the train, of driven codes of a carrier rate to thereby permit the transmission of inverse codes in the opposite direction. In addition, directional stick relays are located at each sgnal location so that following train movements may be made with the usual block spacing protection.

Other objects, purposes, and characteristic features of the present invention will be in part obvious from the accompanying drawings and in part pointed out as the description of the invention progresses.

Figures 2A, 2B, 2C, 2D, 2E:
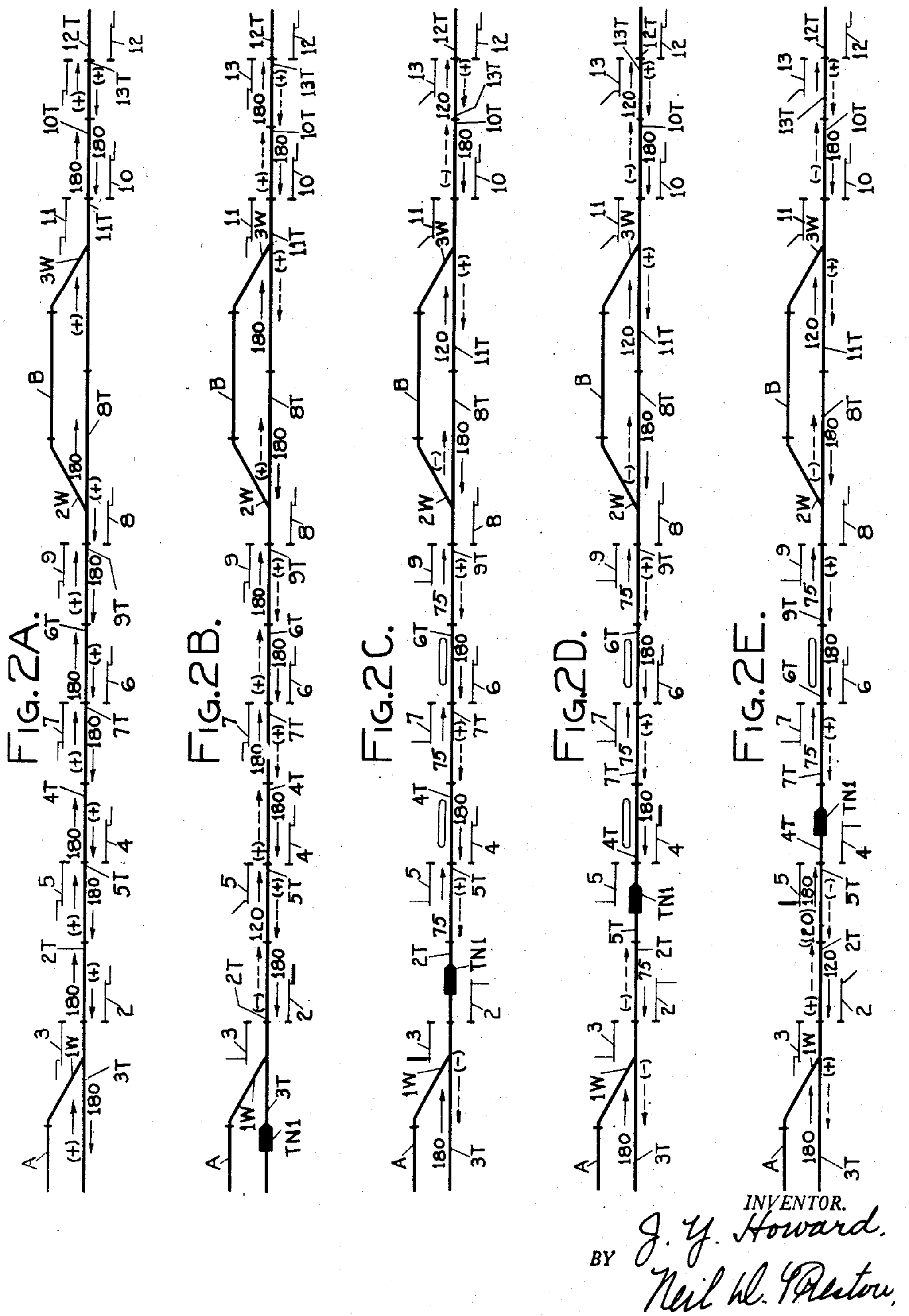
Figures 2F, 2G, 2H, 2I, 2J:
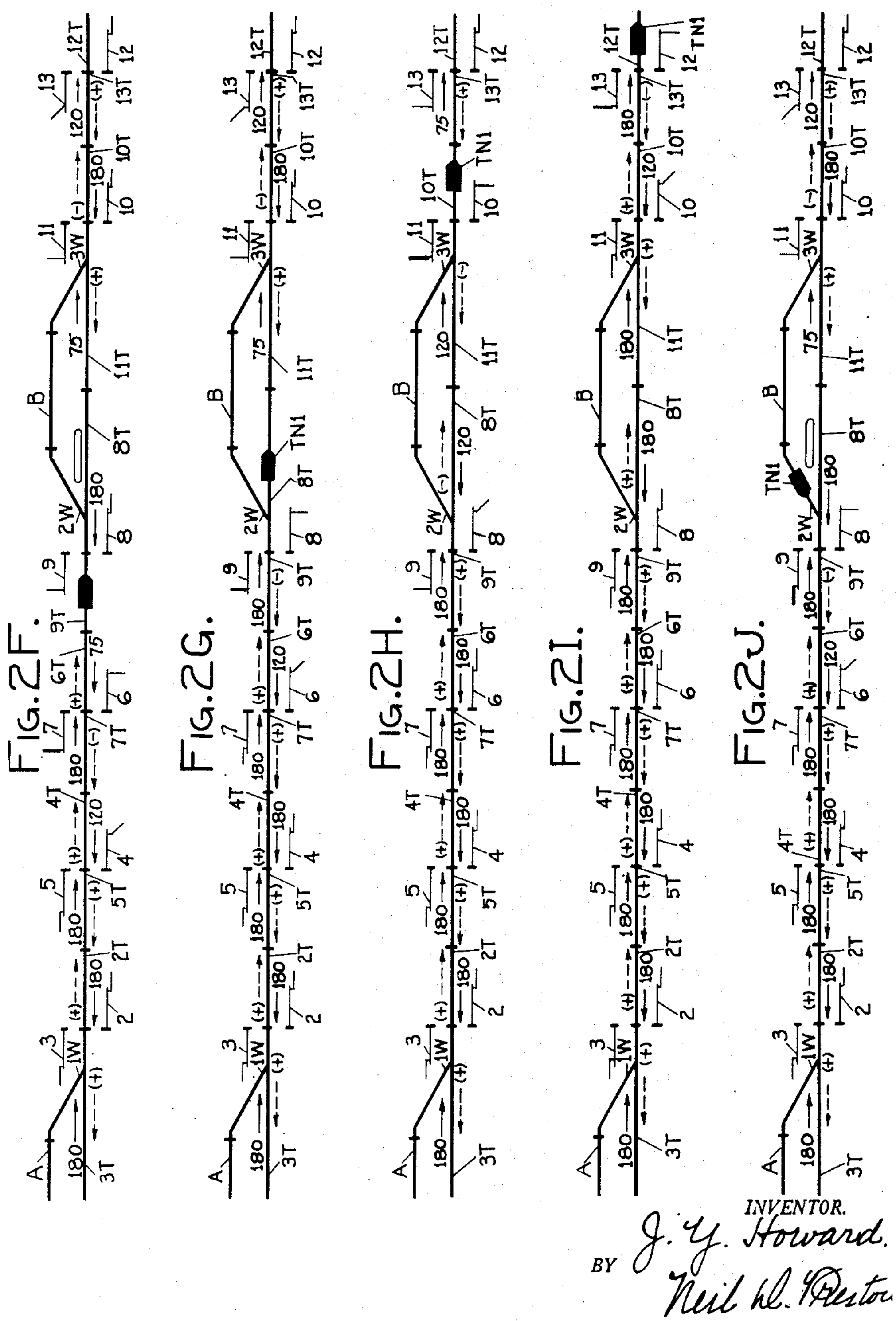
Figure 3:
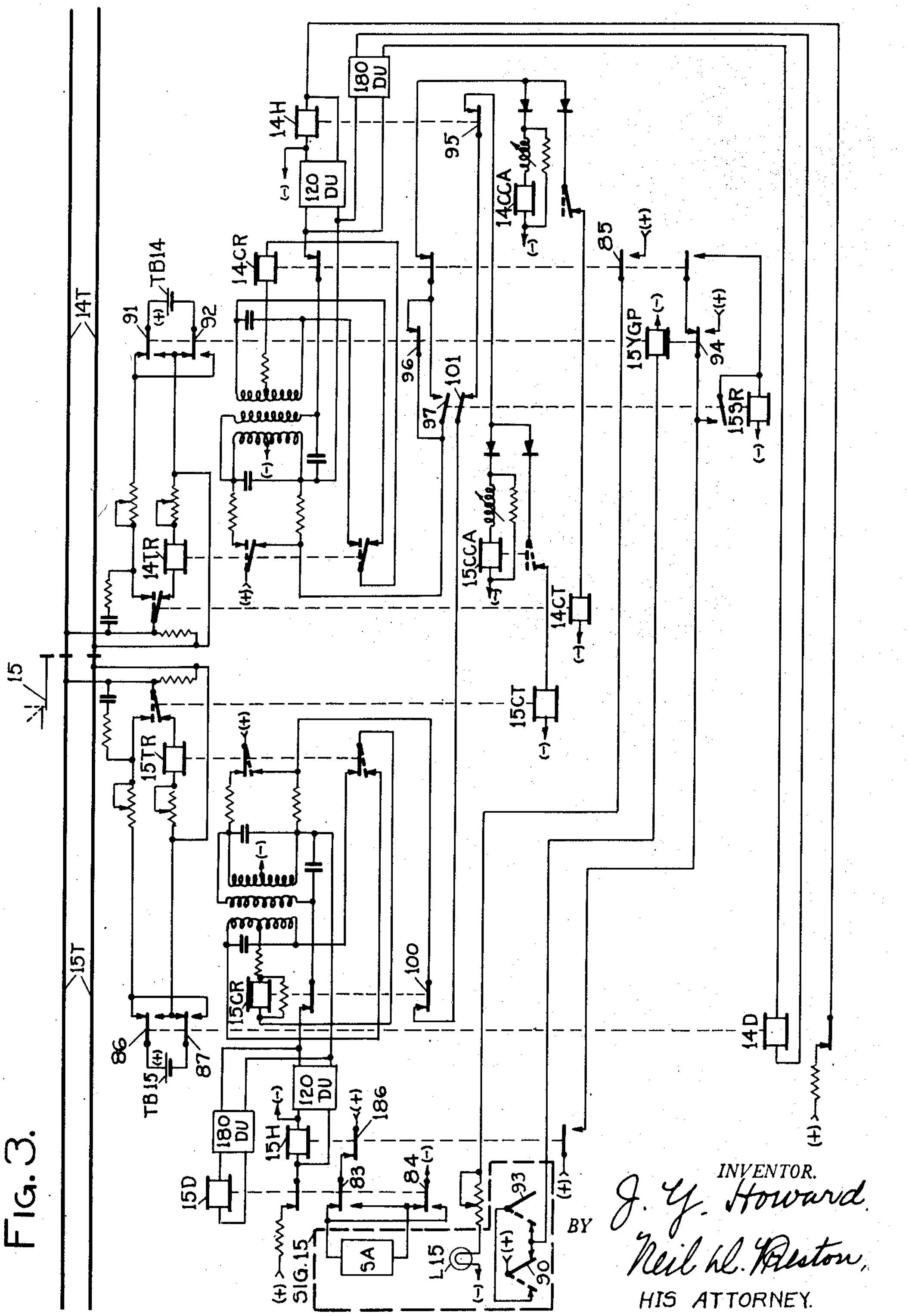

In describing the invention in detail, reference will be made to the accompanying drawings in which like letter reference characters provided with distinctive numerals designate corresponding parts throughout the several views and in which:

Figs. 1A to 1G, inclusive, when placed end to end, illustrate a portion of single track railroad signalled in accordance wth the present invention;

Figs. 2A to 2J illustrate traffic diagrams of the signalling system corresponding to different conditions of train movements; and Fig. 3 illustrates the circuit arrangement at a single intermediate signal location.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all the wiring connections to these terminals.

The symbols (+) and (—) are employed to indicate the positive and negative terminals respectively of suitable batteries or other suitable sources of direct current and the circuits with which these symbols are used always have current flowing in the same direction.

Referring to Figs. 1A to 1G, inclusive, these figures, when placed end-to-end, illustrate a portion of single track railroad between two passing sidings indicated as A and B and including an additional portion of single track to the right of passing siding B. These figures also indicate that the even numbered signals 2, 4, 6, 8, 10 and 12 govern the passage of east bound trains; whereas, the odd numbered signals 3, 5, 7, 9, 11, and 13 govern the passage of westbound trains. The various head-block signals such as signals 2, 9, and 10 are of the absolute type; whereas, all the other signals are of the permissive or Stop-and-Proceed type. It will also be noted that the various track sections have been numbered in accordance with the number of the signal which governs the entrance of trains into that track section. For example, the track section governed by signal 4 has been designated by the reference character 4T.

Each of the track switches located at each end of a passing siding has associated therewith a switch circuit controller, the contacts of which are included in the circuit organization at that location. As an example, Fig. 1A indicates that a contact 10 of the switch 1W circuit controller has been included in the circuit controlling the operation of the yellow-green repeater relay 3YGP. These controllers operate in such a manner that they interrupt the circuit in which they are located only when the switch with which they are associated is out of its normal position. In this connection it should be noted that all of the switches shown are normally positioned so as to permit main line traffic and each contact of a switch circuit controller is, therefore, positioned to close the circuit in which it is included.

In Figs. 2A to 2J, inclusive, the different signal conditions of the portion of railroad track illustrated have been indicated for various possible traffic conditions. In these diagrams it has been expedient to employ conventional symbols. Thus, trains have been indicated in block form and the conditions of the various signals have been represented by the position of a semaphore arm. The semaphore arms have been shown in heavy line for those signals which are illuminated, the position of the arm indicating the particular aspect of the signal which is then being shown. A semaphore arm which is shown as a light solid line indicates the controlled condition of that signal but indicates that that particular signal is not illuminated.

It is contemplated in the present invention that the driven codes will be of certain distinctive rates as, for example, 75, 120, and 180 pulses per minute, although other suitable rates might as well be employed. These driven codes are generated from suitable code generating devices such as code oscillators located at each cut-section.

Figure 1B:
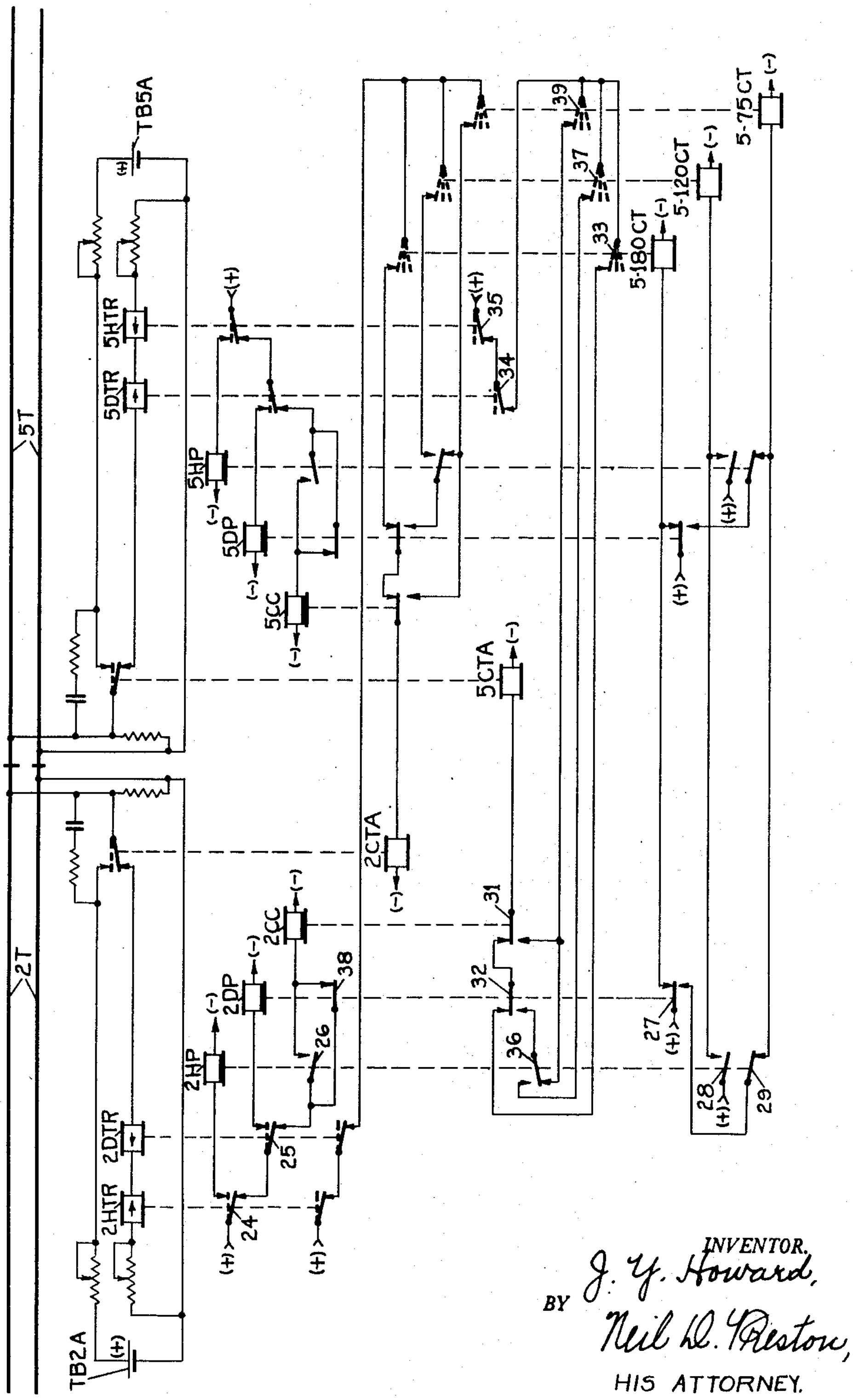

These code oscillators have been denoted in Fig. 1B by the reference characters 5–75CT, 5–120CT, and 5–180CT. It should be understood that each of these code oscillators has a self-contained mechanism which causes its contacts to operate at a certain specified rate. Thus, the oscillators above referred to have contacts which operate at the rate of 75, 120, and 180 pulses per minute, respectively.

In the traffic diagrams of Figs. 2A to 2J, inclusive, an arrow with a solid line shaft is used to designate the direction and presence of a driven code; whereas, an arrow with a dotted line shaft is used to indicate the presence and direction of an inverse code. The particular number appearing near these arrows in the case of the driven codes, indicates the code rate which is represented by that arrow. In the case of the inverse codes, the polarity of such inverse code pulses has been indicated by the sign (+) or (—) adjacent to the arrow indicating an inverse code. An elongated loop indicates that no code pulses are being applied to the associated track section in that direction.

Reference to Figs. 1A to 1G, indicates that there is at each signal location some apparatus which performs a function similar to that performed by corresponding apparatus at each of the other signal locations. Therefore, these similar devices have been given the same letter reference characters, but the devices are made distinctive by reason of the numerals which precede the letter reference characters, the numerals in each case referring to the particular signal with which that apparatus is associated.

Each of the coded track circuits in this circuit arrangement is assumed to be of the conventional direct current type using either primary batteries or trickle charge storage batteries as a source of power for the track current. It should be understood, however, that the track circuits might as well be energized from alternating current sources.

Fig. 1A shows that there is connected across the rails of track section 2T, a track relay 2TR through a back contact 184 of the inverse code transmitting relay 2CT. Track battery TB2 is illustrated as being connected to the track section 2T through front contact 184 of this same relay 2CT and through either front or back contacts 182 and 183 of relay 2PC. The polarity of the code pulses thus applied by the battery TB2 to the track section 2T is dependent upon the position of contacts 182 and 183 of pole changing relay 2PC. If, for example, relay 2PC is picked up so that front contacts 182 and 183 are closed, positive pulses, i. e. top rail positive with respect to the bottom rail, will be transmitted; whereas, if the relay 2PC is dropped away, track battery TB2 will be applied to the rails through back contacts 182 and 183 and the applied code pulses will be of negative polarity. A resistor 14 is shown as being connected across the track rails for the purpose of suppressing any large transient, inductive current which might be produced during conditions of high ballast resistance by a train leaving the track section 2T. Another resistor 15 is included in series with the track relay 2TR. This resistor 15 is preferably of the variable type so that an adjustment may be made for varying track circuit constants. Similarly, a resistor 16 is included in series with the track battery TB2 to permit an adjustment of the current applied to the rails of the track section. A condenser 17 and resistor 18 are connected in series across the front contact 11 of the inverse code transmitting relay 2CT for the purpose of reducing the arcing of this contact as the track battery is intermittently connected to the rails of the track section.

In addition to an inverse code transmitter relay CT being provided for each track section at a signal location, there is also provided a relay CCA, such, for example, as the relay 2CCA of Fig. 1A, for governing the duration of the respective inverse code pulses.

The various signals employed in this signalling system, such as the head-block signal 2 in Fig. 1A may be assumed to be of the searchlight type such as shown in the O. S. Field Patent No. 1,835,150, dated December 8, 1931. The mechanism for this signal is represented diagrammatically within the dotted rectangle designated by the reference character "Sig. 2." In this diagrammatic illustration the operating winding of the signal is designated by the block SA and the lamp of the signal is designated by L2. In addition, movable contacts 20 and 21 are provided which control the operation of a signal repeater relay such as relay 2YGP. All of the signals shown in this embodiment are approach lighted and, therefore, do not actually display an aspect unless there is a train in approach of them. Assuming, however, that a signal is illuminated, the signal apparatus has been diagrammatically arranged so that if the polarity of the voltage applied to the operating winding of the signal is positive, i. e. the top of the block marked SA with respect to its bottom, the signal displays a green aspect; whereas, if the polarity applied to such winding is negative, the signal will display a yellow aspect. If no voltage at all is applied to the operating winding, the signal displays a red aspect.

The movable contacts 20 and 21 associated with the signal 2 operate in such a manner that they are in left-hand and right-hand positions, respectively, when the signal 2 is controlled to display a red aspect; both in right-hand positions when the signal is controlled to display a green aspect; and both in left-hand positions when the signal 2 is controlled to display a yellow aspect.

Although the above description has been directed particularly to the signal 2 shown in Fig. 1A, these remarks apply to all of the other signals shown as well since all of the signals are assumed to be of the same type. Furthermore, although searchlight type signals are shown in this embodiment, any other type of signal such as a color-light or position-light signal might as well be used.

OPERATION

*General*

Figure 1C:
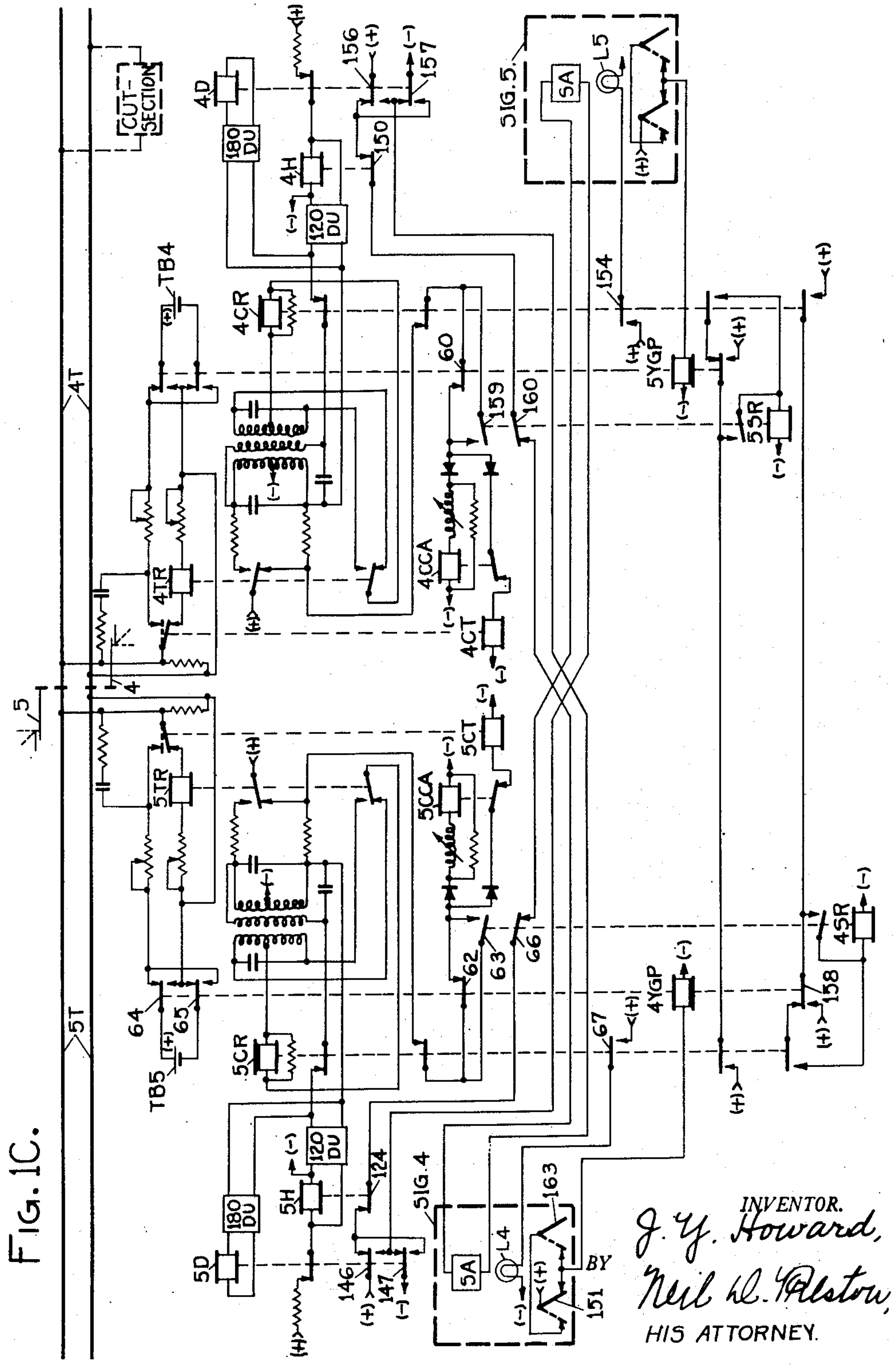
Figure 1D:
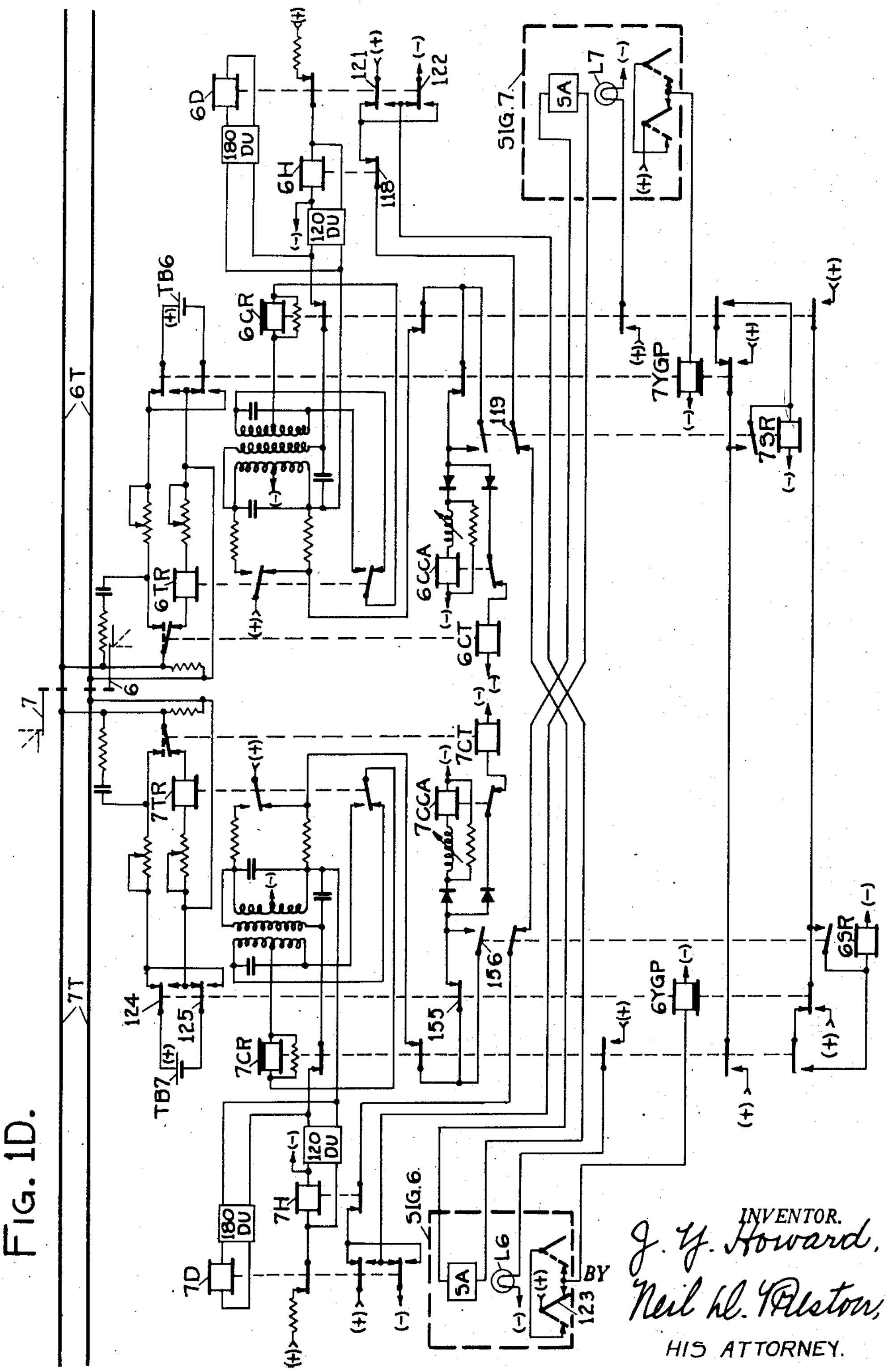
Figure 1E:
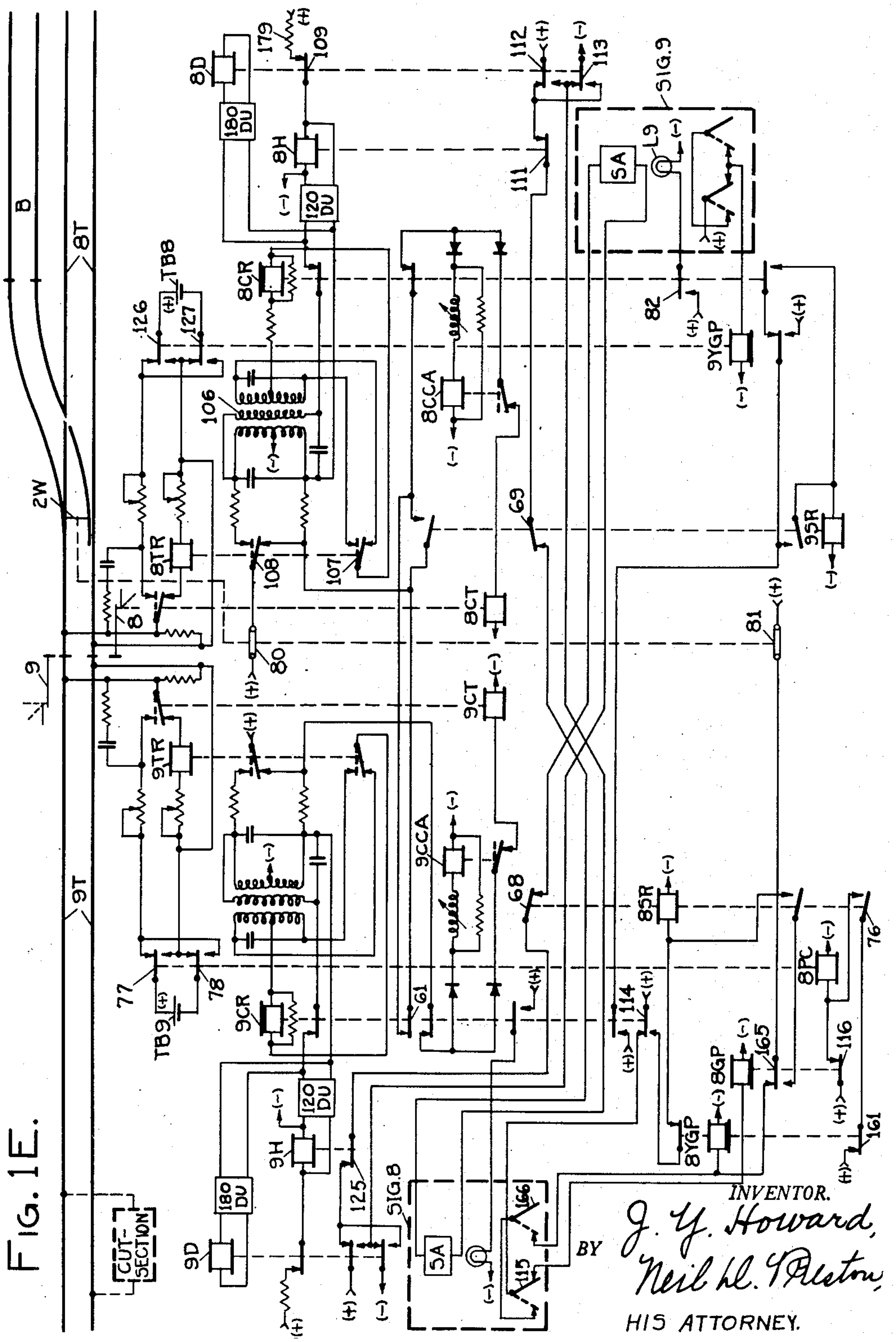
Figure 1F:
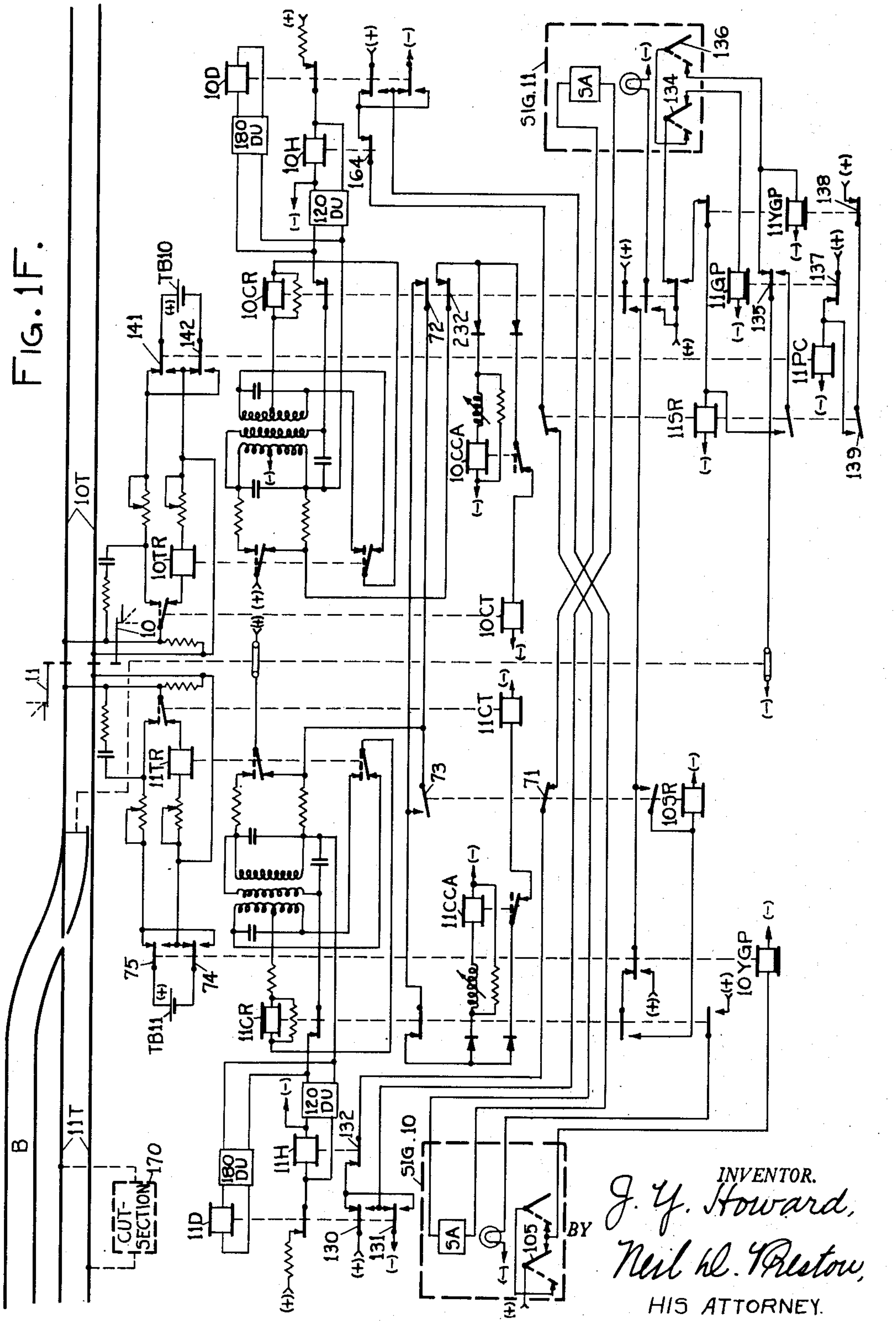
Figure 1G:
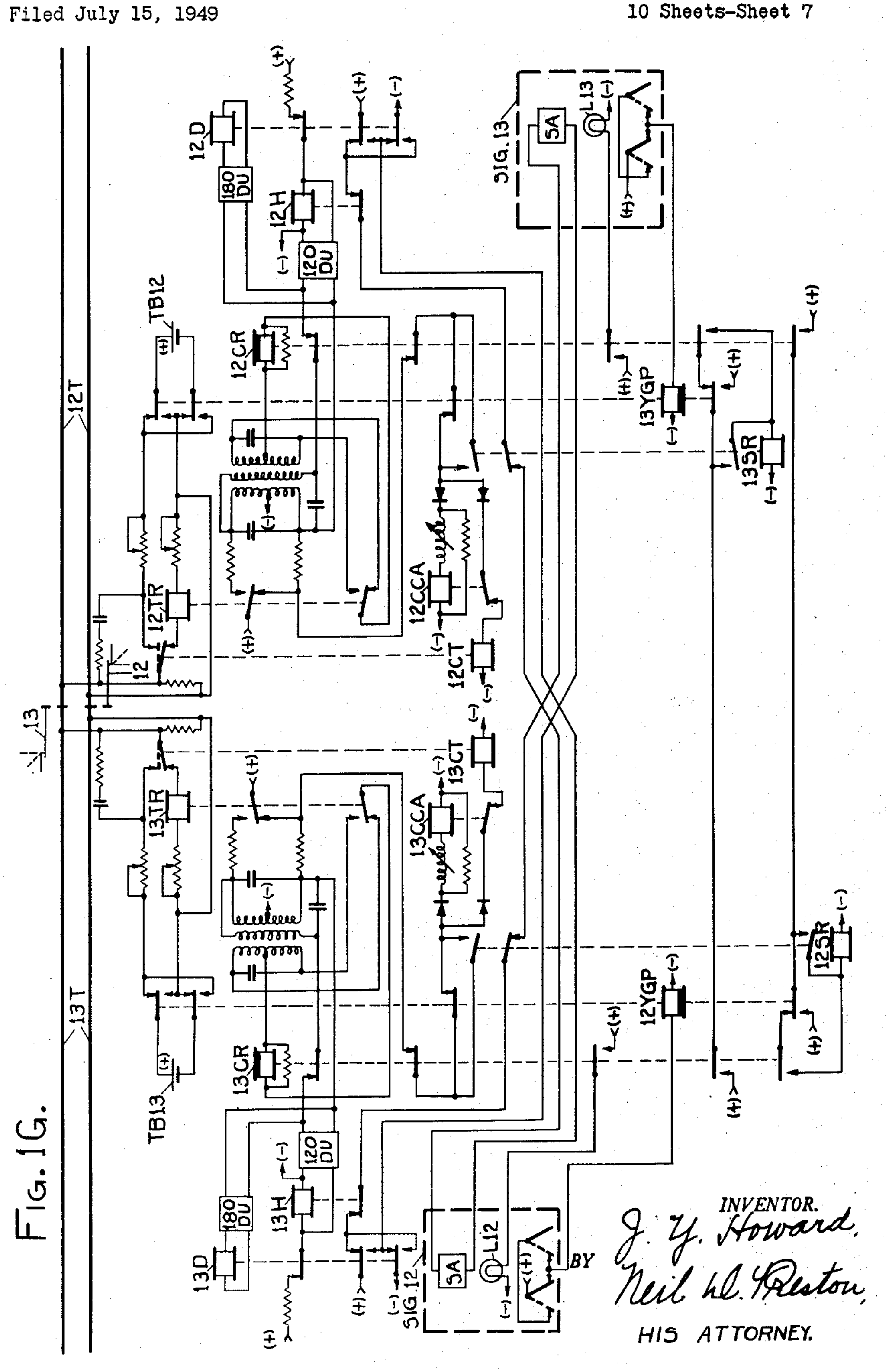

When Figs. 1A and 1F are arranged end-to-end it will be noted that there is a cut-section provided between each of the various signal locations. As has briefly been described, each of these cut-sections includes apparatus whose function it is to apply driven code pulses to the track sections adjoining such cut-section. Thus, the cut-section apparatus shown in Fig. 1B operates to apply driven code pulses to track sections 2T and 5T. The code transmitting relays 2CT and 5CT, of course, operate independently in that the codes applied to the two adjoining track sections may be either of the same or different rates. Since each of these cut-sections are identical with regard to their apparatus and circuit, only one of these cut-sections has been shown in detail (see Fig. 1B). The other cut-sections have all been shown in block form as, for instance the cut-section 170 located between the ends of passing siding B.

At each of the signal locations there are located inverse code transmitters which transmit inverse code pulses back over the adjoining sections to the adjacent cut-sections. Thus, there are two inverse code transmitters 5CT and 4CT at the signal location shown in Fig. 1C which are intermittently energized during each dropping away of the track relay 5TR and 4TR, respectively, to apply polar inverse code pulses to the track sections 5T and 4T, respectively. These inverse code transmitters are of the conventional type and are representative of the inverse code transmitters to be found at all the signal locations. The rectifiers 177 and 178 are included in the circuits to relays 2CCA and 2CT to prevent an inductive voltage surge from picking up these relays when the back contact 176 of track relay 2TR opens. The circuit organization for the control of energization of the inverse code transmitter relay CT is therefore such that each relay CT is picked up upon the dropping away of the associated track relay TR, and the termination of its energization is in accordance with the adjustment of the variable inductance in series with the winding of the associated relay CCA. More specifically, for example, with reference to Fig. 1A, the relay 2CT becomes picked up upon the closure of back contact 176 of relay 2TR by the energization of a circuit including back contact 70 of relay 2CCA. Energy is also applied to relay 2CCA at the same time through back contact 176 of relay 2TR, but the picking up of relay 2CCA is delayed in accordance with the adjustment of the variable inductance 79. When relay 2CCA becomes picked up, the inverse pulse is terminated by the opening of back contact 70 in the circuit for relay 2CT.

*Cut-section (Fig. 1B)*

It is considered desirable at this point to attain an understanding of the manner in which the transmission of driven codes from a cut-section location is controlled. Thus, at each of the cut-sections such as the one shown in Fig. 1B, the polar inverse code received from the signal locations is received by polar relays which pick up only when they are energized by a voltage of a certain polarity. The polarity of the voltage which must be applied to these relays to pick them up is indicated in the drawings by the arrows inclosed within the conventional relay symbol. For example, if the polarity of the voltage applied to the track section 2T is positive with respect to the bottom rail, the relay 2DTR will be picked up.

The circuits at each of the cut-sections are operated in accordance with the polarity of the inverse code pulses received there. Thus, when positive inverse code pulses are received at the cut-section shown in Fig. 1B, each picking up of front contact 25 of relay 2DTR energizes the track repeater relay 2DP through a circuit which includes in addition to contact 25 of the relay 2DP, a back contact 24 of track relay 2HTR. Relay 2DP is provided with sufficiently slow release characteristics to enable it to remain picked up even though it is energized only intermittently when positive code pulses are received. During each "off" period of this inverse code the relay 2CC is energized through a circuit including back contacts 24 and 25 of relays 2HTR and 2DTR, respectively, and front contact 38 of the track repeater relay 2DP. It will be noted that this relay 2CC is also provided with slow release characteristics so that it remains picked up even if it is also energized only intermittently during each "off" period of the inverse code. The relay 2CC acts as a back contact repeater of both track relays 2DTR and 2HTR and insures that the desired operation of the circuit organization will take place only when the energy received at this signal location consists properly of code pulses and not of stray or transient voltages.

When the inverse code pulses received over the track section 2T are of negative polarity, the relay 2HP will be picked up by the intermittent closing of front contact 24 of track relay 2HTR. During each "off" period of this inverse code, the relay 2CC will be energized through a circuit including back contacts 24 and 25 of relays 2HTR and 2DTR, respectively, and front contact 26 of relay 2HP. Thus, although the relay 2CC is picked up by both positive and negative inverse codes, the track repeater relays 2HP and 2DP are selectively energized in accordance with the polarity of the code pulses being received.

The selective picking up of the relays 2HP and 2DP results in the energization of the proper code oscillator so that code pulses of the proper rate may be applied to the adjoining track section 5T. Specifically, the reception of positive inverse code pulses at the cut-section shown in Fig. 1B energizes the 180 code oscillator 5-180CT through a circuit which includes front contact 27 of relay 2DP, and when negative inverse pulses are received, the 120 code oscillator is energized through a circuit including front contact 28 of relay 2HP. When no code pulses are received, the 75 rate code oscillator is energized through back contacts 27 and 29 of relays 2DP and 2HP, respectively. In this manner, any one of the three code oscillators at this location may be made operative as required.

The code transmitting relays at each cut-section are energized in a manner which is also dependent upon the polarity of the received code pulses. Thus, if the inverse code pulses received from the signal 2 location are of positive polarity the coding relay 5CT is energized at the rate of 180 times per minute because, in that case, relays 2DP and 2CC will be picked up, and relay 5CTA will be energized through a circuit including front contact 31 of relay 2CC, front contact 32 of relay 2DP, the front contact 33 of the 180 code oscillator 5-180CT and back contacts 34 and 35 of relays 5DTR and 5HTR, respectively. Since the contact 33 of the 180 code oscillator opens and closes at the rate of 180 times per minute, relay 5CTA will pick up and drop away at this rate so as to apply a 180 driven code to the rails of track section 3T.

By including back contacts 34 and 35 of relays 5DTR and 5HTR, respectively, in the circuit for code transmitter 5CTA, a back contact check of the inverse code is provided for as disclosed in the Preston patent, No. 2,371,263, dated November 9, 1940.

If the inverse code pulses received at the cut-section shown in Fig. 1B are of negative polarity, the coding relay 5CTA will be energized through a circuit including front contact 31 of relay 2CC, back contact 32 of relay 2DP, front contact 36 of relay 2HP, and front contact 37 of the code oscillator 5-120CT so that the relay 5CTA will be energized 120 times per minute. When no code pulses are received at this cut-section, the coding relay 5CTA will ordinarily be energized through a circuit including back contact 31 of relay 2CC and a front contact 39 of code oscillator 5-75CT so that the driven code applied to the rails of track section 5T will be of the 75 rate.

The circuit organization at this cut-section location is so arranged as to permit a rapid transfer of the driven code rate under certain conditions. Thus, if we assume that a positive inverse code has been received over the track section 2T but that these inverse code pulses are suddenly no longer received due to the approach of a train, both of the track relays 2DTR and 2HTR will remain deenergized and have their back contacts closed. Assuming that the previously received code pulses were of positive polarity, a circuit will now be closed to energize relay 2CC through back contacts 24 and 25 of the track relays 2HTR and 2DTR, respectively, and through front contact 38 of relay 2DP since this relay 2DP will remain picked up for an interval corresponding to its slow release time. When the repeater relay 2DP does finally drop away and open its front contact 38, the circuit to relay 2CC will be opened so that this relay will also become deenergized. Obviously however, these relays 2DP and 2CC must each have a release time greater than the "off" periods of the slowest inverse code, and since, as has just been demonstrated, relay 2CC does not drop away until after relay 2DP has dropped away, the above described circuit by means of which relay 5CTA is energized at the 75 rate cannot be established until after a period of time corresponding to two "off" periods of the driven code. Thus, in order to insure that the driven code transmitter 5CTA can be energized during this interim period, an alternate circuit is provided to energize this relay 5CTA through front contact 31 of relay 2CC, back contact 32 of relay 2DP, and back contact 36 of relay 2HP. Then when relay 2CC does finally drop away, the previously described circuit for relay 5CTA which includes back contact 31 of relay 2CC is established. In this manner, a rapid transition is made and the interruption of the driven code applied to track section 5T is avoided.

From the foregoing description it can be seen that the rate of the driven code applied to the track section to one side of the cut section is dependent upon the polarity of the inverse code received over the track section to the other side of the cut-section and that, when no inverse code is received, a 75 rate carrier code is then applied as the driven code. In addition, means are provided to guard against an unsafe condition in the event that undesired, strong voltages are applied to the rails of the various track sections with the result that inverse codes may be used in this signalling system with a maximum of safety.

*Normal conditions (Fig. 2A)*

As an aid in understanding the operation of the signalling system of the present invention, it is believed desirable to point out the manner in which the apparatus is controlled and the various controls transmitted under conditions of no traffic.

As shown in Fig. 2A all of the signals included in this signalling system are normally conditioned to display a green aspect. Thus, beginning with the head-block signal location shown in Fig. 1F, it is evident that since signal 10 is conditioned to give a green aspect, yellow-green repeater relay 10YGP will be energized through contact 105 associated with the signal 10 mechanism. As a result, front contacts 74 and 75 of this relay 10YGP will be closed and positive inverse code pulses will then be applied to the rails of track section 11T. These inverse code pulses will be received at the cut-section location shown in block form as 170 and will cause a driven code of the 180 rate to be transmitted westwardly from this cut-section location over the track section 8T.

The circuit including transformer 106, contact 108 of track relay 8TR, and rectifying contact 107 of the track relay 8TR is conventionally arranged so that code receiving relay 8CR is picked up whenever code pulses of either the 75, 120, or 180 rate are received over track section 8T. This condition presupposes, of course, that switch 2W is in its normal position so that contact 80 associated with the switch 2W circuit controller will be closed thereby permitting an alternating voltage to be applied to the primary of transformer 106 due to the intermittent picking up and dropping away of contact 108 of track relay 8TR. Two decoding units are provided and these are indicated in the drawing by the blocks labeled 120DU and 180DU. If the driven code received over track section 8T is of the 120 rate, relay 8H will be picked up; whereas, if the driven code is of the 180 rate, relay 8D will be picked up. In addition, however, an auxiliary circuit is provided for relay 8H which includes a front contact 109 of relay 8D so that, whenever relay 8D is picked up because of there being a 180 code received at this location, relay 8H will also be picked up. The decoding units 120DU and 180DU are of the conventional type and include a full-wave rectifier. Thus, the winding of relay 8H is connected across the output terminals of this rectifier. For this reason the auxiliary circuit for relay 8H described above is so arranged with respect to its polarity and this rectifier that a short-circuit cannot occur. In addition. resistor 179 is included to prevent excessively high currents should breakdown of the rectifier occur. Under the normal conditions now being considered, when a 180 code is received as has just been described, both relays 8D and 8H are picked up. As a result of this condition, front contact 111 of relay 8H is closed so that a circuit is completed to energize signal 8. Back contact 69 of relay 9SR is, of course, now closed since these directional stick relays are picked up only by the passage of trains past a signal location as will presently be described. Also, since relay 8D is now picked up, front contacts 112 and 113 are closed and the voltage applied to the operating winding of signal 8 is, therefore, of positive polarity and will condition this signal 8 to display a green aspect.

With signal 8 conditioned to display a green aspect and with relay 9CR picked up due to there being driven code pulses received over track section 9T, green repeater relay 8GP will be energized through a circuit including front contact 114 of relay 9CR, and contact 115 associated with the signal 8 mechanism. Thus, relay 8GP will be picked up and, due to the closing of its front contact 116, will energize pole changing relay 8PC. Consequently, front contacts 77 and 78 of this relay 8PC will be closed and the inverse code transmitted over track section 9T will be of positive polarity and will cause a 180 driven code to be received at the signal 6 location shown in Fig. 1D.

The circuit associated with this intermediate signal 6 location is similar, in many respects to that at the head-block location shown in Fig. 1E in that the 180 code received over track section 6T will cause relays 6CR, 6H, and 6D to become energized. Consequently, front contact 118 of relay 6H will be closed and, since back contact 119 of relay 7SR will be closed under these circumstances, a circuit will be completed to energize signal 6. Due to the fact that relay 6D is picked up and its front contacts 121 and 122 closed, this voltage applied to signal 6 will be positive and will condition this signal to give a green aspect. A circuit will then be completed through contact 123 associated with the signal 6 mechanism, to energize yellow-green repeater relay 6YGP. With this relay 6YGP picked up, its front contacts 124 and 125 will be closed and will result in the transmission of a positive inverse code over the rails of track section 7T.

In a manner similar to that which has just been described, each of the various intermediate signals governing east-bound traffic will be conditioned to display a green aspect and will cause the inverse code transmitted westwardly from each of these intermediate signal locations to be of positive polarity. The result will be that a 180 driven code will be received at the head-block signal location shown in Fig. 1A over the track section 2T and will, similarly, cause relays 2CR, 2H, and 2D to be picked up. A similar circuit will then again be completed to supply the operating mechanism of signal 2 with a voltage of positive polarity so that this signal will also be conditioned to display a green aspect. By these means all of the signals governing eastbound traffic are conditionally controlled to display green aspects and, since the circuits are symmetrical, it is obvious that all of the signals governing westbound traffic will be similarly controlled. Thus an organization is provided employing both driven and inverse code with the source of the driven code being located in each case at a cut-section intermediate between the signal locations so organized that, under normal conditions, the driven codes will all be of the 180 rate and the inverse codes will all be of positive polarity.

*Directional stick relays*

An examination of Figs. 1A to 1G, inclusive, points out the fact that the control circuit for each wayside signal includes a contact of a directional stick relay. Therefore, in order to obtain a better understanding of the way in which these signals are controlled, the operation of these stick relays will now be explained.

Each of the directional stick relays at a signal location is picked up by the passage of trains in a particular direction. More specifically, a train passing the head-block signal location shown in Fig. 1A in an easterly direction will cause the picking up of stick relay 2SR while the passage of a train past this same location in a westerly direction will result in the picking up of stick relay 3SR.

Fig. 1A shows that there is associated with the directional stick relay 3SR, a yellow-green repeater relay 3YGP and a green repeater relay 3GP. Both of these signal repeater relays are slow to drop away and this is indicated in the drawings by the heavy line bases of the symbols for these relays. If signal 3 is conditioned to display a green aspect, green repeater relay 3GP will be energized through a circuit including front contact 41 of relay 2CR and contact 42 associated with the signal 3 mechanism. Yellow-green repeater relay 3YGP will then be energized through a circuit including front contact 43 of the relay 3GP and contact 185 of the switch 1W circuit controller. If signal 3 displays a yellow aspect, relay 3GP will be dropped away but relay 3YGP will be energized by a circuit through front contact 41 of relay 2CR and contacts 42 and 44 of the signal 3 mechanism. In either event, relay 3YGP will be picked up and its front contact 45 closed. Then as soon as a westbound train enters track section 2T causing relay 2CR to drop away, a circuit is established to energize relay 3SR from (+), back contact 41 of relay 2CR, front contact 45 of relay 3YGP, the winding of relay 3SR, to (−). The entrance of the train into track section 2T and the resultant dropping away of relay 2CR deenergizes relay 3GP if it has been picked up because of the opening of front contact 41 of relay 2CR. When relay 3GP drops after an interval corresponding to its slow release time, the opening of its front contact 43 deenergizes relay 3YGP while the closing of its back contact 43 establishes a stick circuit for directional stick relay 3SR including contact 185 of the switch circuit controller and front contact 46 of relay 3SR. Relay 3YGP, because of its slow release characteristics, does not immediately drop away upon being deenergized by the opening of front contact 43 of relay 3GP so that there is sufficient time for the above described stick circuit of relay 3SR to be established before the pick-up circuit of this relay 3SR is interrupted by the opening of front contact 45 of relay 3YGP. If the relay 3YGP has been energized through contacts 42 and 44 of the signal 3 mechanism as previously described, this relay will now still be dropped away by the opening of front contact 41 of relay 2CR.

As a result of the stick circuit for relay 3SR being established, relay 3SR will remain picked up until relay 3GP is again picked up, opening its back contact 43 or, until contact 10 of the switch circuit controller is opened by the operation of switch 1W from its normal position.

Another directional stick relay 2SR is associated with signal 2 and is picked up by the passage of eastbound trains as has briefly been explained. Thus, a train approaching the signal 2 location will encounter either a green or yellow aspect from the signal 2 if the track ahead is clear for the required distance. Therefore, the yellow-green repeater relay 2YGP will be energized through a circuit including contact 20 associated with the signal 2 mechanism if signal 2 is conditioned to display a green aspect and will be energized through contacts 20 and 21 if signal 2 is conditioned to display a yellow aspect. Then as the train crosses from the track section 3T into the track section 2T, no code pulses can then be received at this head-block location over either track section 3T or 2T because of the shunting effect of the train with the result that both relays 2CR and 3CR will be dropped away. For this reason, back contacts 47 and 48, respectively, of these relays 2CR and 3CR will be closed so that the directional stick relay 2SR will be picked up through a circuit including these contacts and front contact 50 of relay 2YGP. The presence of the train in track section 2T will cause the deenergization of signal 2 because of the opening of front contact 51 of relay 2H. Thus, with contacts 20 and 21 associated with the signal 2 mechanism in their left-hand and right-hand positions, respectively, the yellow-green repeater relay 2YGP will be deenergized and the closing of its back contact 50 will establish a stick circuit for the relay 2SR through its front contact 52. Because of the slow release characteristics of relay 2YGP the entrance of the train into track section 2T will not result in the dropping away of this relay until the above described pick-up circuit of relay 2SR has been completed. This relay 2SR will remain picked up until the signal 2 again is conditioned to display either a green or yellow aspect which will permit the picking up of relay 2YGP and the opening of its back contact 50 to open the stick circuit.

*Train movements (Figs. 2B–2J)*

In order that a better understanding may be obtained as to the mode of operation of this signalling system, the operation of the circuits will be described for various conditions of traffic. The conditions of the various signals and the rates and polarities of the various codes are shown for a number of different traffic conditions in Figs. 2B to 2J, inclusive. Although specific reference will be made in the ensuing description to the circuit organization shown in Figs. 1A to 1G, inclusive, these traffic diagrams comprise a helpful adjunct to this description as they clearly show the condition of this signalling system corresponding to each of the traffic conditions to be discussed herein.

To maintain a logical order with respect to this description, a train designated TN1 in Figs. 2B to 2J is shown as advancing eastwardly along the portion of single track railroad shown, which corresponds of course, to the portion of track shown in Figs. 1A to 1G.

In Fig. 2B the eastbound train TN1 is shown as having entered the track section 3T opposite the east end of passing siding A. A comparison of this Fig. 2B with Fig. 2A shows that the opposing signal 3 is now conditioned to display a red aspect and that the opposing signal 5 is now conditioned to display a yellow aspect. In addition, signal 2 is now illuminated and displays a green aspect.

The reason that the opposing signals 3 and 5 are now conditioned to display the aspects shown in Fig. 2B is that the shunting effect of the train as it occupies track section 3T, causes the dropping away of relays 3D and 3H. Thus, with front contact 143 of relay 3H open, the circuit to the operating winding of signal 3 is interrupted and this signal is, therefore, now conditioned to display a red aspect. As a result, neither green repeater relay 3GP nor yellow-green repeater relay 3YGP can now be energized through contacts 42 and 44 associated with the signal 3 mechanism. For this reason, both front contacts 144 and 145 of these relays 3GP and 3YGP respectively, will be open so that pole changing relay 2PC can now not be energized. Back contacts 182 and 183 of this relay 2PC will, consequently, be closed so that the inverse code pulses applied to track section 2T will be of negative polarity. The driven code received at the intermediate signal 5 location will, as a result, be of the 120 rate.

At this signal 5 location, shown in Fig. 1C, the relay 5H, will be picked up due to the 120 code being received but the relay 5D will be dropped away. Thus, although front contact 124 of relay 5H is closed so that a circuit is completed to energize the signal 5 operating winding, back contacts 146 and 147 of relay 5D will now be closed so that the voltage applied to the signal 5 operating winding will be of negative polarity and will condition this signal to display a yellow aspect.

The illuminated condition of signal 2 caused by the presence of the train TN1 in track section 3T is produced as a result of the dropping away of code receiving relay 3CR which causes back contact 57 of this relay to be closed so as to apply energy to the lamp L2 of signal 2. As a result, this signal 2 now displays a green aspect, thereby signifying that the train TN1 is free to enter the stretch of single track between passing sidings A and B.

As was previously mentioned, a tumble-down occurs when a train enters the stretch of single track between head-block locations. This condition is shown in Fig. 2C in which the train is shown as occupying the track section 2T. Before examining in detail the manner in which this tumble-down is brought about, it will be noted that, since the train now shunts the rails of track section 2T, relays 2CR, 2H and 2D will be dropped away. Consequently, front contact 51 of relay 2H will now be open thereby deenergizing signal 2 and, since back contact 40 of relay 2CR is now closed so as to energize the lamp L3 of signal 3, this signal now displays a red aspect.

The passing of the train TN1 from track section 3T into track section 2T has caused directional stick relay 2SR to become energized in a manner which has already been described. Thus, even though front contact 30 of relay 2CR is now open, an alternate circuit is now provided through front contact 49 of relay 2SR to energize the inverse code transmitter 3CT. And, since signal 2 is now conditioned to display a red aspect, yellow-green repeater relay 2YGP is now dropped away so that its back contacts 180 and 181 are closed thereby providing that the inverse code pulses transmitted by inverse code transmitter 3CT are of negative polarity.

Under the conditions shown in Fig. 2C, no inverse code pulses can be received at the cut section location shown in Fig. 1B because of the occupancy by the train of track section 2T.

Thus, according to the description of the mode of operation of the circuit organization at a cut section as already set forth, a driven code of the 75 rate will now be transmitted toward the intermediate signal location shown in Fig. 1C.

At this signal 5 location, the code receiving relay 5CR will be picked up by the action of this 75 code, but relays 5D and 5H will be dropped away. As a result, front contact 124 of relay 5H will be opened so as to open the circuit to signal 5 and condition this signal to display a red aspect. Yellow-green repeater relay 5YGP will, therefore, drop away and open its front contact 68, thereby deenergizing the inverse code transmitter 4CT. No inverse code pulses will then be transmitted over the rails of track section 4T and a 75 driven code will, therefore, be received at the intermediate signal location shown in Fig. 1B and will condition signal 7 to display a red aspect. Similarly, all of the intermediate signals governing westbound traffic will be conditioned to display a red aspect and each of the inverse code transmitters at these intermediate signal locations which ordinarily transmits an inverse code eastwardly from such intermediate location, will be made inactive. Consequently, a 75 driven code will also be received at the signal 9 head-block location shown in Fig. 1E.

At the head-block location shown in Fig. 1E, the reception of a 75 rate driven code will cause code receiving relay 9CR to remain picked up but will cause both relays 9D and 9H to drop away. For this reason, front contact 125 of relay 9H will be opened thereby deenergizing signal 9 and conditioning this signal to display a red aspect. However, since code receiving relay 9CR is still picked up, inverse code transmitter 8CT will still be energized through front contact 61 of this relay 9CR and, as a result, inverse code pulses will be applied to the rails of track section 8T. Since yellow-green repeater relay 9YGP will now be dropped away due to the fact that signal 9 is now conditioned to display a red aspect, back contacts 126 and 127 of this relay 9YGP will be closed and the inverse code pulses applied to track section 8T will be of negative polarity. For this reason, the driven code received at the headblock location at the east end of passing siding B (see Fig. 1F) will be of the 120 rate and will cause relay 11H as well as relay 11CR to be picked up. Relay 11D, however, will be dropped away and its back contacts 130 and 131 closed so that, although front contact 132 of relay 11H is closed thereby completing a circuit to the operating windings of signal 11, the voltage thus applied to this signal will be of negative polarity and will condition this signal to display a yellow aspect.

At the head-block location shown in Fig. 1F the inverse code transmitter 10CT will still be energized through a circuit including front contact 232 of code receiving relay 10CR. However, since signal 11 is now conditioned to display a yellow aspect, green repeater relay 11GP can now no longer be energized through contact 134 associated with the signal 11 mechanism. This relay 11GP will, therefore, drop away and, in opening its front contact 135, will open the normal circuit for the energization of yellow-green repeater relay 11YGP. This relay 11YGP will now be energized through a circuit including contacts 134 and 136 associated with the signal 11 mechanism. The opening of front contact 137 of relay 11GP also causes the deenergization of pole changing relay 11PC for, although relay 11YGP is now picked up and its front contact 138 closed, relay 11SR still remains dropped away so that its front contact 139 is open. Thus, back contacts 141 and 142 of pole changing relay 11PC are now closed and the inverse code pulses now applied to the rails of track section 10T are of negative polarity with the result that a driven code of the 120 rate is received at the intermediate signal 13 location shown in Fig. 1G. This 120 driven code will, similarly, cause signal 13 to be conditioned to display a yellow aspect. As a result, yellow-green repeater relay 13YGP will be picked up and the inverse code applied to track section 12T will thus be of positive polarity.

In this manner, a tumble-down of all the opposing signals between passing sidings A and B is produced by the entrance of an eastbound train into the stretch of single track between these passing sidings. In addition, a double caution results for the two opposing signals 11 and 13 to the east of passing siding B. Since the circuit organization of the present invention is symmetrical, the entrance of a westbound train into the stretch of single track between passing sidings A and B will similarly condition all of the opposing signals to display a red aspect and will condition the two opposing signals just to the west of siding A to display a yellow aspect.

When the eastbound train TN1 occupies track section 5T as shown in Fig. 2D, it will be noted from this figure that the only change with respect to the control of the various signals is that signal 4 is now illuminated whereas signal 3 is now no longer illuminated. This change is brought about by the fact that the train in its movement from track section 2T into track section 5T now causes the relay 5CR to be dropped away instead of the relay 2CR. Thus, only the approach lighting of the adjoining signals 3 and 4 is affected because the movement of this train TN1 from track section 2T into track section 5T does not effect the operation of either the D or H relay at either the signal 5 location or the signal 2 location. Thus, since the operation of the signals is affected only by the movement of trains from one signal block into the other except as otherwise mentioned, movement of trains between signal locations, i. e. from one side to the other of a cut-section, will not ordinarily be described in detail.

In Fig. 2E, the eastbound train TN1 is shown as having passed the intermediate signal 4 location. With the train thus occupying track section 4T, relay 4CR, 4D, and 4H will be dropped away. As a result, front contact 150 of relay 4H (see Fig. 1C) will be open thereby deenergizing the operating winding of signal 4 and conditioning this signal to display a red aspect. Yellow-green repeater relay 4YGP can no longer be energized through either contact 151 or contact 163 associated with the signal 4 mechanism so that this relay 4YGP will drop away. The opening of front contact 62 of this relay 4YGP will interrupt the normal circuit for the energization of inverse code transmitters 5CT but, since the passage of the train in an eastbound direction past the signal 4 location has caused directional stick relay 4SR to be picked up, front contact 63 of this relay 4SR will now be closed thereby providing an alternate circuit for the energization of inverse code transmitter 5CT. Since back contacts 64 and 65 of yellow-green repeater relay 4YGP will now be closed the inverse code applied to the track section 5T will be of negative polarity and will cause a 120 code to be received at the signal 2 location shown in Fig. 1A.

At the signal 2 head-block location a 120 driven code received over the track section 2T will cause relays 2CR and 2H to be picked up but will cause relay 2D to remain dropped away. Thus, although front contact 51 of relay 2H will be closed so as to complete a circuit for the energization of the signal 2 operating winding, the voltage thus applied to this operating winding will be of negative polarity since back contacts 53 and 54 of relay 2D will now be closed. As a result, this signal 2 will now be conditioned to display a yellow aspect.

Since signal 2 is now conditionally controlled to give a yellow aspect, yellow-green repeater relay 2YGP will now be energized through a circuit including contacts 20 and 21 associated with the signal 2 mechanism. For this reason, front contacts 180 and 181 of relay 2YGP will now be closed and the inverse code pulses applied to track section 3T will now be of positive polarity.

Because the directional stick relay 4SR is picked up under the conditions shown in Fig. 2E, back contact 66 of this relay will be opened thereby deenergizing the operating winding of signal 5 and conditioning this signal to display a red aspect. In this connection, it will be noted that, at each signal location, the picking up of a directional stick relay by the passage of a train in a particular direction past that signal location conditionally controls the opposing signal to display a red aspect. In this manner, the condition of the directional stick relays is checked to insure that they do not remain picked up at such times as they are supposed to be in their dropped away condition. In the previous description of the way in which the tumble-down operation was produced, it was seen that a necessary step in this procedure was the deactivation of one of the inverse code transmitters by the dropping away of a signal repeater relay. Thus, when signal 5 was controlled to display a red aspect because of there being a 75 rate driven code received over track section 5T, the resultant dropping away of yellow-green repeater relay 5YGP was intended to make the inverse code transmitter 4CTA inactive because of the opening of front contact 60 of this relay 5YGP. If, however, relay 5SR had remained picked up after the previous passage of a westbound train past the signal 5 location, the closed front contact 159 of this relay 5SR would have allowed the continued operation of the inverse code transmitter 4CT thereby preventing a complete tumble-down through the various track sections to the east of this intermediate signal 4 location. However, by including a back contact 160 of relay 5SR in the circuit to the operating winding of signal 4, this signal 4 would remain deenergized and be conditioned to display a red aspect until such time as the directional stick relay 5SR would again be dropped away. In this way, the erroneous operation of the directional stick relay is prevented from causing an unsafe condition.

With the train TN1 occupying track section 4T, relay 4CR will, as has been stated, be dropped away. Thus, back contact 154 of this relay 4CR will be closed thereby energizing lamp L5 of signal 5 so that this signal will now be illuminated.

By analogy from the preceding description, it is obvious that when the train is in track section 6T, there will be a driven code of the 75 rate applied to the track section 9T. This driven code will permit the relay 9CR to be picked up but will, of course, not permit the energization of relay 9H. Thus, signal 9 will be conditioned to display a red aspect and signals 11 and 13 will, as shown in Figs. 2C to 2E, both be conditioned to display a yellow aspect.

In Fig. 2F, the train TN1 is shown as occupying the track section 9T. This drawing shows that in this particular case, the movement of a train from one track section to another while still remaining in the same signal block, does affect the signal operation. Thus, in the condition illustrated in Fig. 2F with the train occupying track section 9T, relays 9CR, 9H, and 9D will be dropped away thereby causing signal 8 to be conditioned for the display of a green aspect. A 75 rate driven code will now be applied to the track section 6T and will condition signal 6 to display a red aspect. Also, relay 6YGP will then be dropped away, opening its front contact 155 but, since directional stick relay 6SR will now be picked up, front contact 156 of this relay 6SR will now be closed to provide an alternate circuit for the energization of inverse code transmitter 7CT. In a manner similar to that already described in connection with the intermediate signal 4, the inverse code transmitted over track section 7T will be of negative polarity so that a 120 driven code will now be received at the signal 4 location. At this signal 4 location, the relay 4H will be picked up but the relay 4D will remain dropped away. Thus, although front contact 150 of relay 4H is now closed to complete a circuit for the energization of the operating winding of signal 4, back contacts 156 and 157 of relay 4D will now be closed and the polarity of the voltage applied to the operating winding of signal 4 will be negative and will condition this signal 4 to display a yellow aspect.

Since signal 4 is conditioned to display a yellow aspect under the conditions shown in Fig. 2F, yellow-green repeater relay 4YGP will now be energized through a circuit including contacts 151 and 163 associated with the signal 4 mechanism. For this reason, the stick circuit for directional stick relay 4SR will be opened by the opening of back contact 158 of relay 4YGP so that this relay 4SR will now drop away. Thus, back contact 66 of this relay 4SR will now be closed thereby allowing a circuit to be completed to the operating winding of signal 5. Since the driven code received at the signal 5 location over the track section 5T is of the 180 rate as shown in Fig. 2F, both relays 5D and 5H will be picked up and the operating winding of signal 5 will, therefore, now be conditioned to display a green aspect.

As has been pointed out, relay 9CR is dropped away under the conditions shown in Fig. 2F. With contact 61 of this relay open, the code transmitter 8CT cannot be energized and no code pulses can then be applied to track section 8T. A 75 driven code will then be received at the signal 11 location and this signal will be conditioned to display a red aspect. The pole changing relay 11PC will still be dropped away so that negative inverse pulses will still be transmitted over track section 10T and signal 13 will, therefore, still be conditioned to display a yellow aspect.

The eastbound train TN1 is shown in Fig. 2G as having passed out of the stretch of single track between passing sidings A and B so that it now occupies track section 8T opposite the west end of passing siding B. With the train in this position, its shunting effect upon the rails of track section 8T causes relays 8CR, 8D, and 8H to be dropped away. With front contact 111 of relay 8H open, the circuit to the operating winding of signal 8 is broken so that this signal is now conditioned to display a red aspect. As a result, neither yellow-green repeater relay 8YGP nor green repeater relay 8GP can now be energized so that with both contacts 161 and 116, respectively, open, pole changing relay 8PC is deenergized. Thus, with back contact 77 and 78 of this relay 8PC closed, the inverse code pulses applied to track section 9TR will be of negative polarity. Consequently, a 120 driven code will be received at the intermediate signal 6 location shown in Fig. 1D, and in a manner similar to that previously described in connection with the other intermediate signals, this signal 6 will now be conditioned to display a yellow aspect. Similarly, a 180 driven code will be received at the intermediate signal 4 location so that this signal will now be conditioned to display a green aspect.

As was the case when the train occupied track section 9T the driven code received at the signal 11 head-block location when the train occupies track section 8T is of the 75 rate. Thus, signal 11 continues to be conditioned to display a red aspect. As before, relay 11PC remains deenergized so that a negative inverse code continues to be applied to track section 10T and causes signal 13 to be so energized that it still is conditioned to display a yellow aspect.

Since the train in passing from section 9T into track section 8T has caused the directional stick relay 8SR to be picked up, back contact 68 of this relay 8SR will be opened and signal 9 will, consequently, be conditioned to display a red aspect.

In Fig. 2H, the eastbound train TN1 is shown as having passed beyond the east end of passing siding B so that it now occupies track section 10T. As a result of this condition, relays 10CR, 10H, and 10D are all dropped away. Thus front contact 164 of relay 10H is open so as to deenergize signal 10 whereby this signal 10 is now conditioned to display a red aspect. As a result, yellow-green repeater relay 10YGP can now not be energized through contact 105 of the signal 10 repeater mechanism so that this relay 10YGP now drops away. Although front contact 72 of the code receiving relay 10CR is now open, inverse code transmitter 11CT can still be energized through front contact 73 of relay 10SR which has been picked up by the movement of the train from track section 11T into track section 10T. Thus, the inverse code transmitter 11CT is made operative to apply negative inverse code pulses to track section 11T. The driven code received at the west end of passing siding B is, therefore, of the 120 rate and causes the signal 8 to be conditioned to display a yellow aspect.

At the head-block location shown in Fig. 1E, the stick circuit for the relay 8SR is shown as including a back contact 165 of the green-repeater relay 8GP. Although yellow-green repeater relay 8YGP is, under the circumstances shown in Fig. 2H, energized through a circuit including contacts 115 and 166 of the signal 8 repeater mechanism, the green repeater relay 8GP remains deenergized. Thus, back contact 165 of this relay 8GP remains closed and the relay 8SR, as a result, remains picked up. For this reason both front contacts 161 and 76 of the relays 8YGP and 8SR, respectively, are picked up and complete a circuit for the energization of relay 8PC. Thus, front contacts 77 and 78 of this relay 8PC are closed so that positive inverse code pulses are now applied to track section 9T with the result that the intermediate signal 6 is conditioned to display a green aspect.

From the foregoing description, it can be seen that the circuit organization with respect to the pole changing relay 8PC is so organized as to permit not only the double caution provision as previously described, but also the customary block spacing protection for following traffic. Thus, if signal 8 is conditioned to display a yellow aspect so that yellow-green repeater relay 8YGP is picked up but green repeater relay 8GP dropped away, the inverse code pulses transmitted to the rear of the signal 8 will be of such a polarity as to condition that signal to display a yellow aspect, thereby providing for the double caution feature. If, however, under these circumstances relay 8SR has been picked up by the passage of an eastbound train, the conditioning of signal 8 to display a yellow aspect will not be due to the overlap control caused by a train entering the stretch of single track to the right of passing siding B but will instead be an indication that the signals to the rear of such eastbound train are to progressively clear. Thus, the circuit is so arranged that the conditioning of signal 8 to display a yellow aspect, coupled with the picking up of the directional stick relay 8SR by an eastbound train, will cause the pole changing relay 8PC to pick up. In this manner, a positive inverse code will be transmitted to the intermediate signal 6 location and this signal 6 will then be conditioned to display a green aspect.

When the train occupies track section 12T as shown in Fig. 2I, the condition of signals 10, 11, 12, and 13 are the same as that of the corresponding signals 2, 3, 4, and 5 under the conditions shown in Fig. 2E. Since signal 10 is now energized to give a yellow aspect, the relay 10YGP is picked up and positive inverse code pulses are applied to track section 11T and result in the display of a green aspect by the signal 8.

In Fig. 2J a train TN1 is shown about to move out of the west end of passing siding B into the stretch of single track between sidings A and B. When the switch 2W is moved from its normal position to permit this train move, the action of the switch 2 circuit controller causes its contacts 80 and 81 to open the circuits in which they are included. Thus, the contact 80 is controlled to open the circuit to the transformer 106 and to the inverse code transmitter 8CT. As a result, relays 8CR, 8H, and 8D drop away and the inverse code transmitter 8CT is made inoperative. Since front contact 111 of relay 8H is now open, the operating winding of signal 8 cannot be energized and this signal 8 will, therefore, be conditioned to display a red aspect. Because of this condition of signal 8, both signal repeater relays 8GP and 8YGP will be dropped away and the pole changing relay 8PC will, therefore, be deenergized. Consequently, back contacts 77 and 78 of this relay 8PC will be closed and the inverse code then applied to track section 9T will be of negative polarity. A driven code of the 120 rate will then be received at the intermediate signal 6 location shown in Fig. 1D so that this signal 6 will now be conditioned to display a yellow aspect.

Since back contact 82 of the code receiving relay 8CR will now be closed, the lamp L9 of signal 9 will be energized so that this signal 9 will now display a green aspect if the driven code received over track section 9T is of the 180 rate. Of course, if the driven code received is of the 120 rate signal 9 will display a yellow aspect and if a 75 driven code is received signal 9 will display a red aspect.

If we assume that a 180 rate driven code is received over track section 9T but that signal 9 has been conditioned to display a red aspect due to the picking up of the directional stick relay 8SR by an eastbound train so as to cause the opening of back contact 68 of this relay 8SR, the opening of contact 81 of the switch 2 circuit controller will interrupt the stick circuit for this relay 8SR so that it will drop away. Thus, although the signal 9 will ordinarily not clear until the signal 8 is cleared, the throwing of the switch 2W removes this control and allows signal 9 to give an indication as to the traffic conditions in the stretch of single track between head-block locations.

*Operation (Fig. 3)*

In the event that it is desired to use a single intermediate signal location for the stretch of single track between head-block signals in place of the double intermediate signals whose operation as already described, the embodiment shown in Fig. 3 may be used.

Fig. 3 illustrates that there are H and D relays at this signal location whose operation is similar to that of the corresponding relays at all of the other signal locations. Relay 14H, for example, is picked up whenever the driven code pulses received over the rails of track section 14D are of either the 120 or 180 rate, whereas the relay 14D is picked up only when the code received over track section 14T is of the 180 rate. Similarly, signal 15 can be conditioned to display either a yellow or green aspect only when code pulses of the 120 or 180 rate respectively, are over track section 15T so as to cause the picking up of relay 15H and the closing of its front contact 186. The position of contacts 83 and 84 of relay 15D determine the polarity of the voltage applied to the operating mechanism of signal 15. Thus, this signal will be positively energized and conditioned to display a green aspect when relay 15D is picked up and front contacts 83 and 84 of this relay closed while the closing of back contacts 83 and 84 of relay 15D will result in negative energization of signal 15 thereby conditioning this signal to display a yellow aspect. Lamp L15 associated with the signal 15 is approach lighted through back contact 85 of relay 14CR so that signal 15 is illuminated whenever there is a train in occupancy of track section 14T.

The polarity of the inverse code transmitted over track section 15T is dependent upon the position of contacts 86 and 87 of relay 14D. Thus, if driven code pulses of the 180 rate are received over track section 14T so as to cause the picking up of relay 14D, front contacts 86 and 87 of this relay will be closed and the inverse code applied to track section 15T will be of positive polarity. If, on the other hand, a 120 code is received over track section 14T so that relay 14D will be dropped away, the inverse code applied to track section 15T will be of negative polarity.

The polarity of the inverse code applied to track section 14T is dependent upon the condition of yellow-green repeater relay 15YGP. Thus, if signal 15 displays a green aspect so that relay 15YGP is energized through a circuit including contact 90 associated with the signal 15 mechanism, front contacts 91 and 92 of relay 15YGP will be closed and the inverse code applied to track section 14T will be of positive polarity. Similarly, this inverse code will be of positive polarity if signal 15 displays a yellow aspect for, in that case, relay 15YGP will be energized through contacts 90 and 93 associated with the signal 15 mechanism. If, however, signal 15 displays a red aspect, relay 15YGP will be dropped away and the inverse code applied to track section 14T will be of negative polarity.

Only one directional stick relay is provided at this single intermediate signal location. This directional stick relay 15SR is picked up by the passage of a westbound train in a manner similar to that previously described in connection with directional stick relay 2SR shown in Fig. 1A. Since the stick circuit for this relay 15SR includes a back contact 94 of relay 15YGP, relay 15SR will remain energized only so long as signal 15 is conditioned to display a red aspect.

In order to provide the tumbledown feature included in this signalling system, the inverse code transmitter 15CT includes in its circuit a front contact 95 of relay 14H so that no inverse code pulses will be transmitted over track section 15T whenever a 75 driven code or no driven code is received over track section 14T resulting in the dropping away of relay 14H. With respect to the operation of inverse code transmitter 14CT, the circuit for this transmitter includes a front contact 96 of relay 15YGP in parallel with a front contact 97 of relay 15SR so that, in the event the 75 driven code or no driven code is received over track section 15T, thereby conditioning signal 15 to display a red aspect, relay 15YGP will be dropped away in which case inverse transmitter 14CT can be energized only if front contact 97 of relay 15SR is closed. By means of this arrangement a tumble-down is provided in either direction while still making it possible for an inverse code to be transmitted eastwardly from the signal 15 location even though a westbound train has just passed the signal 15 location thus permitting following train moves.

With respect to the operation of inverse code transmitter 15CTA, the circuit for this transmitter includes, in addition to front contact 95 of relay 14H, a front contact 100 of relay 15CR and a back contact 101 of directional stick relay 15SR. Obviously, if a westbound train has caused relay 15SR to be picked up, no code can be transmitted over track section 15T. As a result, the next intermediate signal to the west of signal 15 which governs eastbound traffic will remain deenergized and be conditioned to display a red aspect until relay 15SR is again dropped away. In this way the proper operation of this directional stick relay is checked.

It follows then from the preceding description that single intermediate signal locations such as that shown in Fig. 3 may be used in place of the double intermediate signals as these single intermediate signal locations fulfill all the requirements of the present invention. Thus, provision is made for a tumble-down upon the entrance of a train into the stretch of single track between head-block signal locations and a directional stick relay is provided so as to permit the following train movement with the usual location spacing protection.

*Summary*

A signalling system of the APB type has therein been described which employs both driven and inverse codes and which provides that driven codes be applied to each signal block by cut-section apparatus located at the mid-portion of each signal block. By using a system of this type safe operation is assured under all required conditions while yet entailing the use of a minimum of equipment.

Having described a coded track circuit signalling system as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. In a coded track circuit signalling system for a stretch of single track divided by means of insulated joints into a plurality of track sections, driven code transmitters located at alternate joints for applying driven code pulses to each track section adjoining said alternate insulated joint, said driven code transmitting means being continuously active to transmit in both directions away from said alternate joints, irrespective of the presence of trains, and irrespective of the direction of traffic, and inverse code transmitting means located at the remaining alternate joints for applying inverse codes to each track section adjoining said remaining alternate joints, whereby the codes traveling in a particular direction along said single track stretch are in consecutive track sections alternately of the driven and inverse type.

2. In a coded track circuit signalling system for a stretch of single track, a cut-section located intermediate between the ends of said stretch of single track dividing said stretch of track into two separate track sections, code transmitting means located at said cut-section location for applying driven code pulses at distinctive rates to said track sections to either side of said cut-section, said driven code transmitting means being continuously active to transmit in both directions away from said cut-section location, irrespective of the presence of trains and irrespective of the direction of traffic, and an inverse code transmitter located at each end of said stretch of single track for transmitting inverse polarized code pulses from said ends of said stretch of single track to said cut-section locations whereby the code pulses travelling in either direction along said stretch are in consecutive track sections alternately of the inverse and driven type.

3. In a coded track circuit signalling system for a stretch of single track, wayside signals for both directions located at spaced intervals along said stretch dividing it into a plurality of signal blocks, cut-sections located at the midportion of each of said signal blocks dividing each of said blocks into two track sections, driven code transmitting means at said cut-section locations for applying code pulses to each of said adjoining track sections, said driven code transmitting means being continuously active to transmit always in the same direction, irrespective of the direction of traffic, inverse code transmitting means at each of said signal locations for applying code pulses to each of the adjoining track sections, and means at said cut-section locations including track relays connected across the rails of each of the adjoining track sections for acting on said driven code transmitting means to cause signal clearing codes to be transmitted to the wayside signal governing entrance of trains into said block when an inverse code is received from the wayside signal at the other end of said block, and to cause a nonsignal clearing code to be transmitted when no inverse code is received from the other end.

4. In a coded track circuit signalling system for a stretch of single track, a wayside signal located at each end of said single track stretch governing train movement in either direction out of said single track stretch, cut-section apparatus located intermediate between said signal locations dividing said signal track stretch into two track sections, means at said cut-section location for applying driven code pulses at all times to both of said track sections at selected rates, irrespective of the presence of trains or the direction of traffic, circuit means at each of said signal locations including a normally energized code receiving relay, whereby the deenergization of said receiving relay due to the shunting effect of a train causes the particular signal at the occupied end of said single track stretch to become illuminated.

5. In a coded track circuit signalling system for a stretch of single track railroad, wayside signals located at spaced intervals along said stretch dividing it into a plurality of signal blocks, cut-section apparatus located at a midportion of each of said blocks dividing it into two track sections, driven code transmitting means located at each cut-section location for applying code pulses at all times to said track sections to either side of said cut-section location, said driven code transmitting means being effective to transmit always in the same direction, irrespective of the direction of traffic, inverse code transmitting means at said signal locations for transmitting code pulses over the track section to either side of said signal location, normally energized code receiving relays at each signal location with one of said relays associated with each adjoining track section and energized whenever driven code pulses are received over said associated track section, a lamp for illuminating each wayside signal and arranged to be energized through a back contact of the particular code receiving relay associated with said track section in approach of said particular wayside signal, whereby the shunting effect of a train as it occupies any track section causes the signal in approach of said train section to become illuminated.

6. In a coded track circuit signalling system for a stretch of single track, wayside signals for both directions of traffic located at spaced intervals along said stretch to divide it into a plurality of signal blocks, a cut-section located at a midportion of each of said blocks to divide each block into two track sections, driven code transmitting means located at each of said cut-section locations for applying driven codes in opposite directions for governing the entering signals at both ends of that block, said driven code transmitting means being continuously active to transmit in both directions away from said cut-section, irrespective of the presence of trains, and irrespective of the direction of traffic, and inverse code transmitting means at each signal for transmitting an inverse code away from that signal over the track section which that signal governs only providing the associated signal for the opposite direction is cleared by the reception of a driven code, circuit means associated with said driven code transmitting means for permitting driven code of a signal-clearing characteristic to be transmitted to either end of said block only when an inverse code is received from the other end of said block but permitting a driven code of a non-signal-clearing characteristic to be transmitted at other times, whereby the entrance of a train into said stretch of single track causes a tumble-down action resulting in the removal of all inverse codes and all signal-clearing codes for the opposite direction to thereby hold the opposing signals at stop.

7. In a coded track circuit signalling system for a stretch of single track, wayside signals governing traffic in both directions and dividing said stretch into a plurality of signal blocks, a cut-section located intermediate between each pair of said signal locations dividing each of said signal blocks into two track sections, means including inverse and driven code transmitters for causing the codes traveling in a particular direction in said stretch to be alternately driven and inverse in consecutive track sections with said inverse code pulses being transmitted from said signal locations to said cut-section locations and with said driven code pulses being transmitted from said cut-section locations to said signal locations, said means being effective to always transmit in the same direction, irrespective of the direction of traffic, circuit means at said signal locations including relays selectively energized in accordance with the rate of the driven codes being received at such location for controlling said signals, circuit means at said signal locations including signal repeater relays for determining the polarity of said inverse codes in accordance with the controlled conditions of said signals, circuit means at said cut-section locations including polar track relays for causing the driven codes applied to the track section to one side of said cut-sections to be in accordance with the rate of the driven code received over the track section to the other side of said cut-section and for causing a driven code carrier rate to be applied when no inverse code is received, whereby the entrance of a train into said single track section causes all of the driven codes transmitted from the entrance to the exit end of said stretch to be of the carrier rate thereby conditioning all opposing signals to display a red aspect, and whereby the said conditioning of said signals result in there being no inverse code pulses being transmitted from the entering to the exit end of said stretch thereby producing a tumble-down of all opposing signals.

8. In a coded track circuit signalling system for a single track railroad including a stretch of single track having passing siding associated therewith, said stretch of track forming a block within the limits of the passing siding, entering and head-block signals at each end of said passing siding, means for applying driven codes to the track rails of said stretch of single track to feed toward each of said head-block and entering signals, inverse code transmitting means located at each end of said passing siding for transmitting inverse codes over said block within the limits of the passing siding, only when a driven code is received over the stretch of single track at that end of said siding, driven code rate control means located at an intermediate point in said block for selecting the application of driven codes of a signal clearing characteristic to the main track in one direction when an inverse code is received from the opposite direction and for selecting the transmission of a driven code of a non-signal clearing characteristic when no invrese code is received from the opposite direction, whereby the entrance of a train into said stretch of single track at either end of said siding places the entering signal at the other end of said passing siding at stop.

9. In a coded track circuit signalling system for a single track railroad including a stretch of track having a passing siding associated therewith, said stretch of track forming a block within the limits of the passing siding, entering and head-block signals at each end of said passing siding, means for at times applying driven codes of a signal clearing characteristic to the track rails of said single track stretch beyond the ends of the siding so as to feed toward said head-block and entering signals, and for transmitting a non-signal clearing carrier code at other times when said signal clearing codes are not being transmitted, a code receiving relay at each of said head-block signal locations which is energized whenever any driven code pulses are received over the associated single track stretches, inverse code transmitting means at each of said signal locations for transmitting inverse codes over said siding section only when the code receiving relay associated with said inverse code transmitting means is energized, driven code transmitting means located at the midportion between the ends of said siding for applying driven codes of a signal clearing characteristic to said stretch of track in one direction when an inverse code is received from the opposite direction and for transmitting a driven code of a non-signal clearing characteristic when no inverse code is received from the opposite direction, said driven codes governing the operation of said entering signals at the corresponding ends of said passing siding.

10. In a coded track circuit signalling system for a stretch of single track, a cut-section located intermediate between the ends of said stretch dividing said stretch into two track sections, driven code transmitting means at said cut-section location including a code transmitting relay having front and back contacts for transmitting driven codes to each end of said stretch, said code transmitting means being active to transmit a selected code in each direction from said cut-section, irrespective of the passage of trains, and irrespective of the direction of traffic, inverse code transmitting means at each end of said stretch for transmitting inverse code pulses toward said cut-section location, track relays having front and back contacts with one of said track relays connected through a back contact of said code transmitting relay across the rails of each track section adjoining said cut-section location, said code transmitting relay being intermittently energized through a back contact of said track relay, whereby the application of an undesired steady voltage to the rails of said track section prevents the intermittent picking up and dropping away of said track relay.

11. In a coded track circuit signalling system for a stretch of single track, wayside signals for both directions at spaced intervals along said stretch dividing it into a plurality of signal blocks, cut-sections located near the mid-point of each signal block dividing each of said blocks into two track sections, inverse code transmitting means at each signal location for transmitting inverse codes under certain conditions in either or both directions away from said signal location, driven code transmitting means at each of said cut-sections for transmitting a signal clearing code over an adjoining track section when an inverse code is received over the other adjoining track section and for transmitting a non-signal clearing driven code when no inverse code is received, said driven code transmitting means being continuously active to transmit always in the same direction, irrespective of the direction of traffic, circuit means at each signal location for preventing transmission of inverse code in a particular direction upon the entrance of a train into said stretch traveling in that direction, whereby the only codes traveling in that direction in said stretch are driven codes of non-signal clearing carrier rate in alternate track sections thereby permitting the transmission of inverse codes in the opposite direction so as to clear said signals governing the movement of said train.

12. An absolute permissive block coded track circuit signalling system for railroads comprising in combination, a stretch of single track having a passing siding associated therewith, signals located at both ends of the passing siding for governing traffic over said stretch in both directions, a cut-section in said stretch between said signal locations, coded track circuit transmitting means at said cut-section for transmitting selected track circuit code through the track rails in both directions, said transmitting means being continuously effected, irrespective of the presence of trains, and irrespective of the direction of traffic, inverse code transmitting means at each of said signal locations for transmitting toward said cut-section an inverse code of a selected character, and inverse code receiving means at said cut-section distinctively conditioned in response to the character of the inverse code received, said inverse code receiving means being effective to govern the rate of driven code transmission through the adjoining track section to selectively apply code pulses to that track section at a clear or caution signal clearing rate in accordance with the inverse code being received.

13. An absolute permissive block signalling system comprising in combination, a stretch of single track having passing sidings at intervals along the trackway and signals at the ends of the sidings for governing traffic between sidings, there being at least one intermediate signal between sidings, a cut-section between each of the signals, coded track circuit driven code transmitting means at said cut-section for transmitting selected track circuit codes through the track rails in both directions at rates determined by reception of inverse code transmitted through the adjoining track section, said driven code transmitting means being continuously active to transmit always in the same direction, irrespective of the direction of traffic, inverse code transmitting means at each of the signal locations for transmitting toward said cut-section between that signal and the next signal in advance an inverse code of a selected character, inverse code receiving means at said cut-section distinctively conditioned in response to the character of the inverse code received, said inverse code receiving means being effective to select a clear or caution signal clearing code rate for transmission through the adjoining track section by said driven code transmitting means.

14. An absolute permissive block coded track circuit signalling system comprising in combination, a stretch of single track having passing sidings at intervals along the trackway and signals at the ends of the sidings, there being at least one intermediate signal between sidings, a cut-section between each of the signals spaced along the trackway, driven code transmitting and inverse code receiving means connected to the track rails at both sides of the joints at each of the cut-sections, said driven code transmitting means being always active to transmit a driven code over the track rails at a selected rate in both directions from the associated cut-section, irrespective of the direction of traffic and irrespective of the passage of trains, inverse code transmitting and driven code receiving means at each of the signal locations connected to the track rails at both sides of the associated signal so as to feed in both directions from that location for governing the rate of driven code transmission from the next cut-section, and signal control means for governing the aspect of each signal in accordance with the rate of the track circuit code received through the track rails in advance of that signal.

15. An absolute permissive block coded track circuit signalling system for railroads comprising in combination, a stretch of single track having a passing siding associated therewith, signals located at both ends of the passing siding for governing traffic over said stretch in both directions, a cut-section in said stretch between said signal locations, driven code transmitting and inverse code receiving means connected to the track rails at both sides of the joints at the cut-section, said driven code transmitting means being always active to transmit a driven code over the track rails in both directions from the associated cut-section at a rate selected by the code receiving means of the adjoining track section, said driven code transmitting means being effective at all times, irrespective of the direction of traffic, and irrespective of the passage of trains, inverse code transmitting and driven code receiving means at each of the signal locations connected to the track rails at both sides of the associated signal so as to feed in both directions from that location for governing the rate of driven code transmission from the next cut-section, and signal control means for governing the aspect of each signal in accordance with the rate of the track circuit code received through the track rails from in advance of that signal.

JAMES Y. HOWARD.

References Cited in the file of this patent

UNITED STATES PATENTS

| Number | Name | Date |
|---|---|---|
| 2,171,771 | Thompson | Sept. 5, 1939 |
| 2,291,579 | Judge | July 28, 1942 |